(12) United States Patent
Lee et al.

(10) Patent No.: US 11,900,043 B2
(45) Date of Patent: Feb. 13, 2024

(54) ELECTRONIC DEVICE FOR MANUFACTURING SEMICONDUCTOR DEVICE AND OPERATING METHOD OF ELECTRONIC DEVICE

(71) Applicant: Samsung Electronics Co., Ltd., Suwon-si (KR)

(72) Inventors: Sooyong Lee, Yongin-si (KR); Dongho Kim, Hwaseong-si (KR); Sangwook Kim, Yongin-si (KR); Jungmin Kim, Hwaseong-si (KR); Seunghune Yang, Seoul (KR); Jeeyong Lee, Anyang-si (KR); Changmook Yim, Hwaseong-si (KR); Yangwoo Heo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 67 days.

(21) Appl. No.: 17/701,520

(22) Filed: Mar. 22, 2022

(65) Prior Publication Data

US 2023/0028712 A1   Jan. 26, 2023

(30) Foreign Application Priority Data

Jul. 23, 2021 (KR) .................. 10-2021-0097066

(51) Int. Cl.
*G06F 30/30* (2020.01)
*G03F 7/00* (2006.01)
(Continued)

(52) U.S. Cl.
CPC ............ *G06F 30/398* (2020.01); *G03F 7/705* (2013.01); *G03F 7/70441* (2013.01);
(Continued)

(58) Field of Classification Search
None
See application file for complete search history.

(56) References Cited

U.S. PATENT DOCUMENTS

| 10,534,257 B2 | 1/2020 | Tetiker et al. |
| 10,585,347 B2 | 3/2020 | Sriraman et al. |

(Continued)

FOREIGN PATENT DOCUMENTS

KR    102218364 B1    2/2021

*Primary Examiner* — Leigh M Garbowski
(74) *Attorney, Agent, or Firm* — Harness, Dickey & Pierce, P.L.C.

(57) ABSTRACT

Disclosed is an operating method of an electronic device which includes receiving a design layout for manufacturing the semiconductor device, generating a first layout by performing machine learning-based process proximity correction (PPC), generating a second layout by performing optical proximity correction (OPC), and outputting the second layout for a semiconductor process. The generating of the first layout includes generating a first after cleaning inspection (ACI) layout by executing a machine learning-based process proximity correction module on the design layout, generating a second after cleaning inspection layout by adjusting the design layout based on a difference of the first after cleaning inspection layout and the design layout and executing the process proximity correction module on the adjusted layout, and outputting the adjusted layout as the first layout, when a difference between the second after cleaning inspection layout and the design layout is smaller than or equal to a threshold value.

20 Claims, 19 Drawing Sheets

(51) Int. Cl.
*G06F 30/398* (2020.01)
*G06F 30/392* (2020.01)
*G06F 30/27* (2020.01)
*G06F 119/18* (2020.01)

(52) U.S. Cl.
CPC ............ *G06F 30/27* (2020.01); *G06F 30/392* (2020.01); *G06F 2119/18* (2020.01)

(56) References Cited

U.S. PATENT DOCUMENTS

| | | |
|---|---|---|
| 10,796,068 B2 | 10/2020 | Kwon et al. |
| 11,132,788 B2 * | 9/2021 | Dou ................. G06T 7/001 |
| 11,763,058 B2 * | 9/2023 | Lee .................. G03F 7/70441 |
| | | 716/53 |
| 2020/0074611 A1 | 3/2020 | Dou et al. |
| 2021/0066283 A1 | 3/2021 | Kim et al. |
| 2021/0334444 A1 | 10/2021 | Lee et al. |

\* cited by examiner

ELECTRONIC DEVICE FOR MANUFACTURING SEMICONDUCTOR DEVICE AND OPERATING METHOD OF ELECTRONIC DEVICE

CROSS-REFERENCE TO RELATED APPLICATIONS

This application claims priority under 35 U.S.C. § 119 to Korean Patent Application No. 10-2021-0097066 filed on Jul. 23, 2021, in the Korean Intellectual Property Office, the disclosures of which are incorporated by reference herein in their entireties.

BACKGROUND

Embodiments of the present disclosure relate to an electronic device, and more particularly, relate to an electronic device capable of improving reliability and a speed associated with generating a layout for a device, and to an operating method of the electronic device.

A process for manufacturing a device (e.g., a semiconductor device) is implemented by a combination of various procedures such as etching, depositing, planation, growth, implanting, etc. The etching may be performed by forming a pattern of a photo resist on a target and removing portions of the target, which are not covered by the photo resist, by using, e.g., chemicals, gas, plasma, ion beam, etc.

Process errors may occur due to various factors in the process of performing the etching. The factors causing the process error may come from a feature of a process and/or may come from a feature of a semiconductor pattern implemented by the patterning, and/or from the etching of a photoresist. The process error coming from the feature of the pattern may be compensated for by revising and/or changing a layout of patterns.

As a semiconductor device may be highly integrated and a nano-scale manufacturing technology is applied to the process, the number of patterns included in the layout is sharply increasing. Accordingly, the amount of computation for revising and/or changing a layout of patterns may also sharply increase to compensate for the process error(s).

SUMMARY

Embodiments of the present disclosure provide an electronic device capable of generating a layout for manufacturing a semiconductor device with improved reliability and the amount of computation reduced, and an operating method of the electronic device.

According to an embodiment, an operating method of an electronic device for manufacturing a semiconductor device includes receiving a design layout for manufacturing the semiconductor device; generating a first after cleaning inspection (ACI) layout by performing a machine learning-based process proximity correction on the design layout; generating a second after cleaning inspection layout by adjusting the design layout based on a difference of the first after cleaning inspection layout and the design layout; performing the machine learning-based process proximity correction on the adjusted layout; outputting the adjusted layout as a first layout when a difference between the second after cleaning inspection layout and the design layout is smaller than or equal to a threshold value; generating a second layout by performing optical proximity correction (OPC) on the first layout; and outputting the second layout for a semiconductor process.

According to an embodiment, an operating method of an electronic device for manufacturing a semiconductor device includes receiving a design layout and an after cleaning inspection (ACI) layout corresponding to the design layout; measuring at least one of a bias(s), a critical dimension (CD), or a mis-align between the design layout and the after cleaning inspection layout; tagging features on the after cleaning inspection layout; and performing learning on a process proximity correction module based on the tagged features and at least one of the bias(s), the critical dimension, or the mis-align.

According to an embodiment, an electronic device includes a memory, and at least one processor that executes a machine learning-based process proximity correction module for manufacturing a semiconductor device, by using the memory. The at least one processor generates a first after cleaning inspection (ACI) layout by executing the machine learning-based process proximity correction on a design layout stored in the memory, adjusting the design layout based on a difference of the design layout and the first after cleaning inspection layout, executing the machine learning-based process proximity correction on the design layout to generate a second after cleaning inspection (ACI) layout, and storing, in the memory, the adjusted layout as a layout in which process proximity correction is completed when a difference of the design layout and the second after cleaning inspection layout is smaller than or equal to a threshold value.

BRIEF DESCRIPTION OF THE FIGURES

The above and other objects and features of the present disclosure will become apparent by describing in detail embodiments thereof with reference to the accompanying drawings.

DETAILED DESCRIPTION

Below, some example embodiments of the present disclosure will be described in detail and clearly to such an extent that an ordinary one in the art can easily implements the invention. Below, the term "and/or" is interpreted as including any one of items listed with regard to the term, or a combination of some of the listed items.

Figure 1:
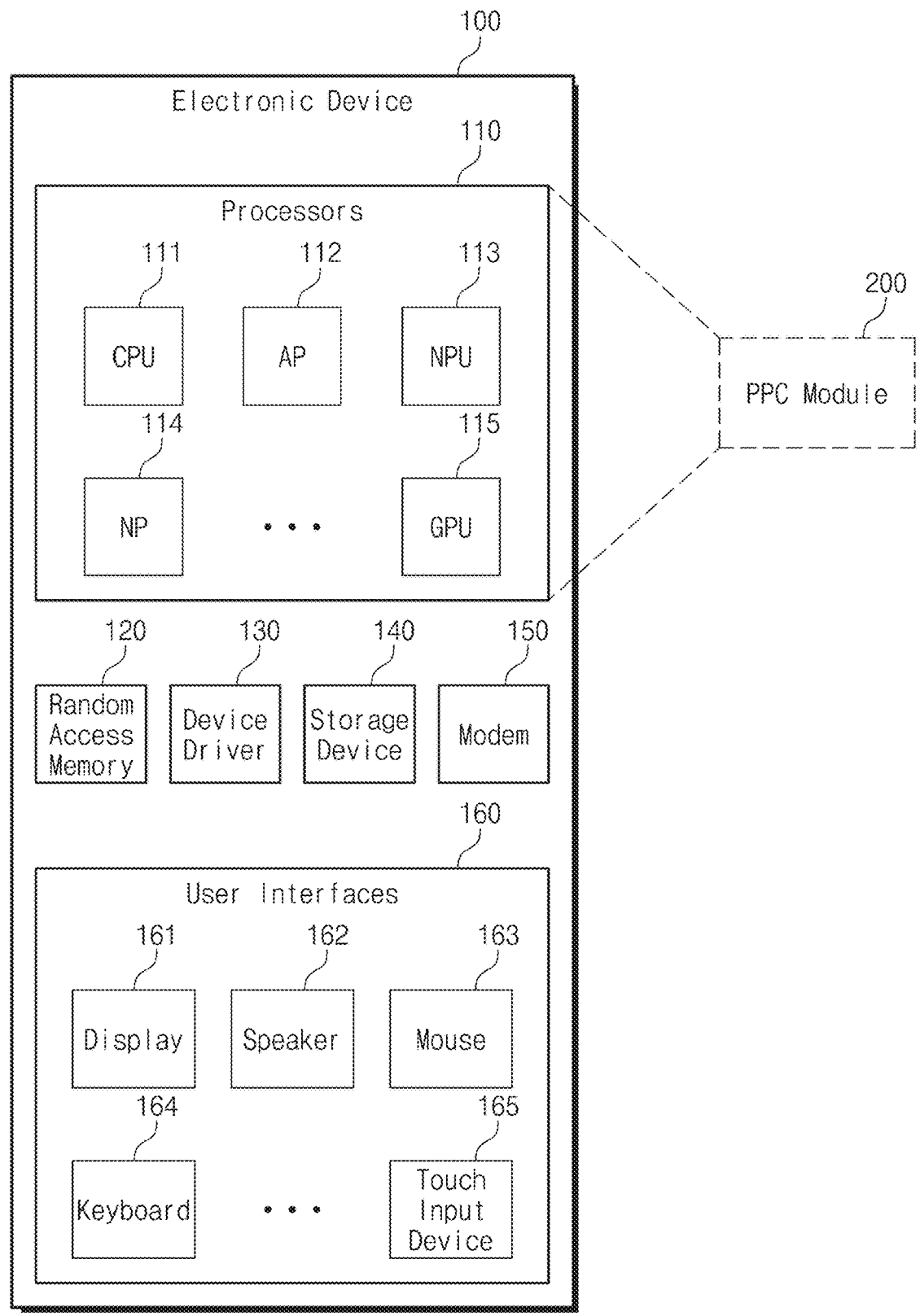
FIG. 1 is a block diagram illustrating an electronic device according to some example embodiments of the present disclosure.

FIG. 1 is a block diagram illustrating an electronic device 100 according to some example embodiments of the present disclosure. Referring to FIG. 1, the electronic device 100 may include processors 110, a random access memory 120, a device driver 130, a storage device 140, a modem 150, and user interfaces 160.

The processors 110 may include, for example, at least one general-purpose processor such as a central processing unit (CPU) 111 and/or an application processor (AP) 112. Also, the processors 110 may further include at least one special-purpose processor such as a neural processing unit (NPU) 113, a neuromorphic processor (NP) 114, a graphics processing unit (GPU) 115, and/or the like. Though illustrated as including the CPU 111, AP 112, NPU 113, NP 114, and GPU 115, the example embodiments are not so limited. For example the processors 110 may include more or fewer processors than illustrated. The processors 110 may include two or more homogeneous processors.

At least one of the processors 110 may be used to train a process proximity correction (PPC). For example, at least one of the processors 110 may train a process proximity correction module 200 based on various data and/or information. The PPC may, for example, be used to produce instructions for modifying a mask to correct and/or compensate for sources of errors (e.g., optical distortions, interferences, shadows, etc.) which may otherwise affect a layout of a manufactured device. A description of an example PPC will be provided in further detail below.

At least one (and/or at least another) of the processors 110 may execute the process proximity correction module 200. The process proximity correction module 200 may perform the generation of a layout for manufacturing a semiconductor device, based on, e.g., machine learning and/or deep learning. For example, the process proximity correction module 200 may be implemented in the form of instructions (and/or codes) that are executed by at least one of the processors 110. In this case, the at least one processor may load the instructions (and/or codes) of the process proximity correction module 200 onto the random access memory 120.

For example, in some example embodiments, at least one (and/or at least another) of the processors 110 may be manufactured to implement the process proximity correction module 200. For example, the at least one processor may be a dedicated processor that is implemented (e.g. in hardware) based on the process proximity correction module 200 generated by training the process proximity correction module 200.

In some other example embodiments, the at least one (and/or at least another) of the processors 110 may be manufactured to implement various machine learning and/or deep learning modules. For example, the at least one processor may be (and/or include), in some example embodiments, the NPU 113 and/or the NP 114. The at least one processor may implement the process proximity correction module 200 by receiving information (e.g., instructions and/or codes) corresponding to the process proximity correction module 200.

In some example embodiments, the processors 110 may perform various processes necessary to and/or beneficial for generating a layout for manufacturing a semiconductor device. For example, the processors 110 may execute codes of optical proximity correction (OPC) and/or may execute an optical proximity correction module trained based on machine learning.

The random access memory 120 may be used as a working memory of the processors 110 and/or may be used as a main memory and/or a system memory of the electronic device 100. The random access memory 120 may include a volatile memory such as a dynamic random access memory, a static random access memory, and/or the like, and/or may include a nonvolatile memory such as a phase-change random access memory, a ferroelectric random access memory, a magnetic random access memory, a resistive random access memory, and/or the like.

The device driver 130 may control the following peripheral devices depending on a request of the processors 110: the storage device 140, the modem 150, and the user interfaces 160. The storage device 140 may include a stationary storage device such as a hard disk drive and/or a solid state drive, and/or include (and/or be connected to) a removable storage device such as an external hard disk drive, an external solid state drive, and/or a removable memory card.

The modem 150 may provide remote communication with an external device. The modem 150 may perform wired or wireless communication with the external device. The modem 150 may communicate with the external device based on at least one of various communication schemes communication interface protocols such as Ethernet, wireless-fidelity (Wi-Fi), long term evolution (LTE), a third generation communication system such as code division multiple access (CDMA), global system for mobile communications (GSM), north American digital cellular (NADC), extended-time division multiple access (E-TDMA), and/or wide band code division multiple access (WCDMA), a fourth generation communication system such as 4G LTE, $5^{th}$ generation (5G) mobile communication, and/or the like.

The user interfaces 160 may receive information from a user and/or may provide information to the user. The user interfaces 160 may include at least one user output interface such as a display 161, a speaker 162, and/or the like; and/or at least one user input interface such as a mouse 163, a keyboard 164, a touch input device 165, and/or the like. Though illustrated as including the display 161, the speaker 162, the mouse, 163, the keyboard 164, and the touch input device 165, the example embodiments are not so limited, and may, e.g., include more or fewer elements. In some example embodiments, for example, some of the user interfaces 160 may be combined (e.g., to include a touch screen).

The instructions (and/or codes) of the process proximity correction module 200 may be received through the modem 150 and may be stored in the storage device 140. The instructions (and/or codes) of the process proximity correction module 200 may be stored in a removable storage device, and the removable storage device may be connected with the electronic device 100. The instructions (and/or codes) of the process proximity correction module 200 may be loaded from the storage device 140 onto the random access memory 120 and may be executed on the random access memory 120.

Figure 2:
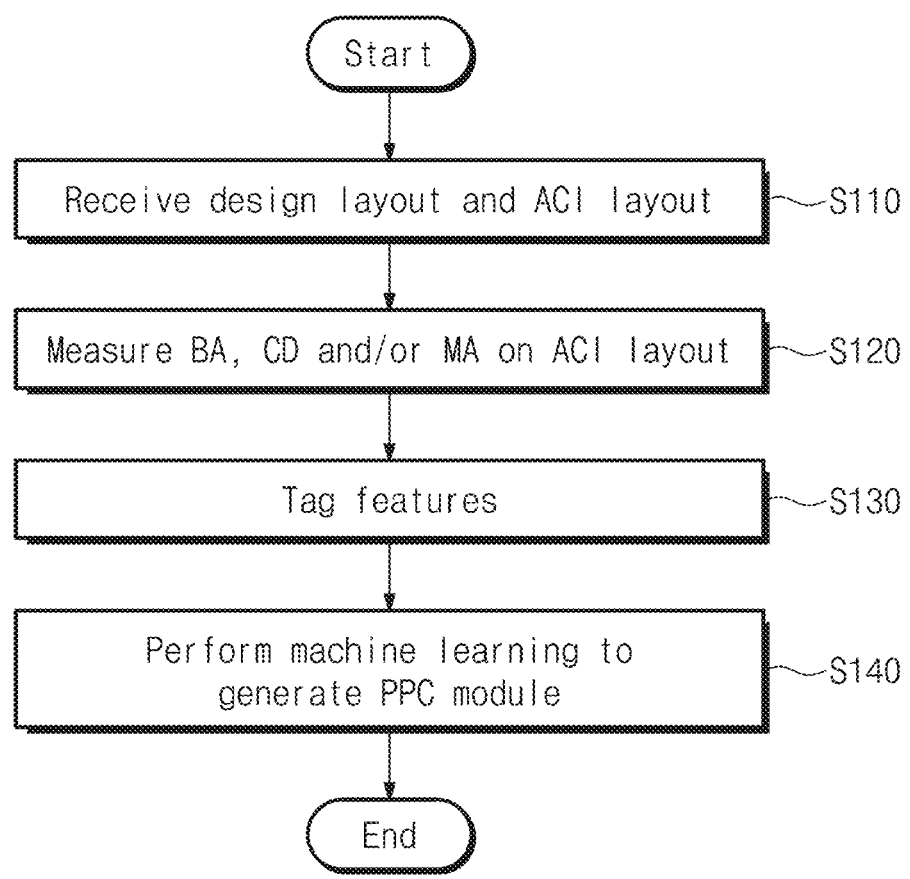
FIG. 2 is a flowchart illustrating an example in which an electronic device performs machine learning on a proximity correction module.

FIG. 2 is a flowchart illustrating an example in which the electronic device 100 trains the process proximity correction module 200. Referring to FIGS. 1 and 2, the process proximity correction module 200 may use various artificial neural networks and processing models, such as a convolutional neural network (CNN), a deconvolutional neural network, a recurrent neural network (RNN) selectively including a long short-term memory (LSTM) unit and/or a gated recurrent unit (GRU), a stacked neural network (SNN), a state-space dynamic neural network (SSDNN), a deep belief network (DBN), a generative adversarial network (GAN), a restricted Boltzmann machine (RBM), and/or the like. For example, the process proximity correction module 200 may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests. The process proximity correction module 200 may be trained based on an edge-biased method beyond a CD-biased method. The process proximity correction module 200 may perform the PPC based on the edge-based method beyond the CD-based method.

In operation S110, the electronic device 100 may receive a design layout and an after cleaning inspection (ACI) layout corresponding to the design layout. The design layout may include, e.g., a structure to be manufactured through one or more semiconductor processes and may be in the form of an image. The image may be two-dimensional 2D) and/or three-dimensional (3D). The after cleaning inspection (ACI) layer may include a result of performing a semiconductor process using the design layout and may be in the form of an image (2D and/or 3D).

For example, the semiconductor process(es) may include at least one of a process of depositing a semiconductor material, a process of depositing a photoresist, a photolithography process of generating a photomask by patterning the photoresist by using a design layout, an etching process of patterning (or multi-patterning) the semiconductor material using the photomask, a cleaning process of removing residual materials and the photomask, and/or the like. In the semiconductor process, the order of the listed processes may be changed, some of the listed processes may be omitted, and/or an unlisted process(es) may be added.

The after cleaning inspection (ACI) layout may be a layout corresponding to a result of actually performing the semiconductor process based on the design layout and/or may be a layout generated by using simulation software.

In some example embodiments, the electronic device 100 may receive a plurality of design layouts, and a plurality of after cleaning inspection (ACI) layers respectively corresponding to the plurality of design layouts. The plurality of design layouts and the plurality of after cleaning inspection (ACI) layers may be transferred from a database, which is independent of the electronic device 100, through a wired or wireless interface.

In operation S120, the electronic device 100 may measure a bias(s) BA, a critical dimension (CD), and/or a mis-align (MA), in the design layouts and the after cleaning inspection (ACI) layers. The bias(s) BA may correspond to a difference between the edges of patterns and/or spaces of the design layout and the edges of patterns or spaces of the ACI layout. The critical dimension CD may correspond to a width of the patterns and/or spaces of the design layout and the patterns or spaces of the ACI layout (or a difference thereof). The mis-align MA may correspond to a difference of centerlines and/or angles of the patterns and/or spaces of the design layout and centerlines and/or angles of the patterns or spaces of the ACI layout.

In operation S130, the electronic device 100 may tag features of environments of the design layout or ACI layout, in which the bias(s) BA, the critical dimension CD, and/or the mis-align MA is measured, with the bias(s) BA, the critical dimension CD, and/or the mis-align MA.

In operation S140, the electronic device 100 may generate the PPC module 200 by performing machine learning based on the bias(s) BA, the critical dimension CD, and/or the mis-align MA and the tagged features. For example, when the bias(s) BA, the critical dimension CD, and/or the mis-align MA is input to the electronic device 100, the electronic device 100 may train the PPC module 200 such that the ACI layout corresponding to the input bias(s) BA, the input critical dimension CD, and/or the input mis-align MA is generated.

Figure 3:
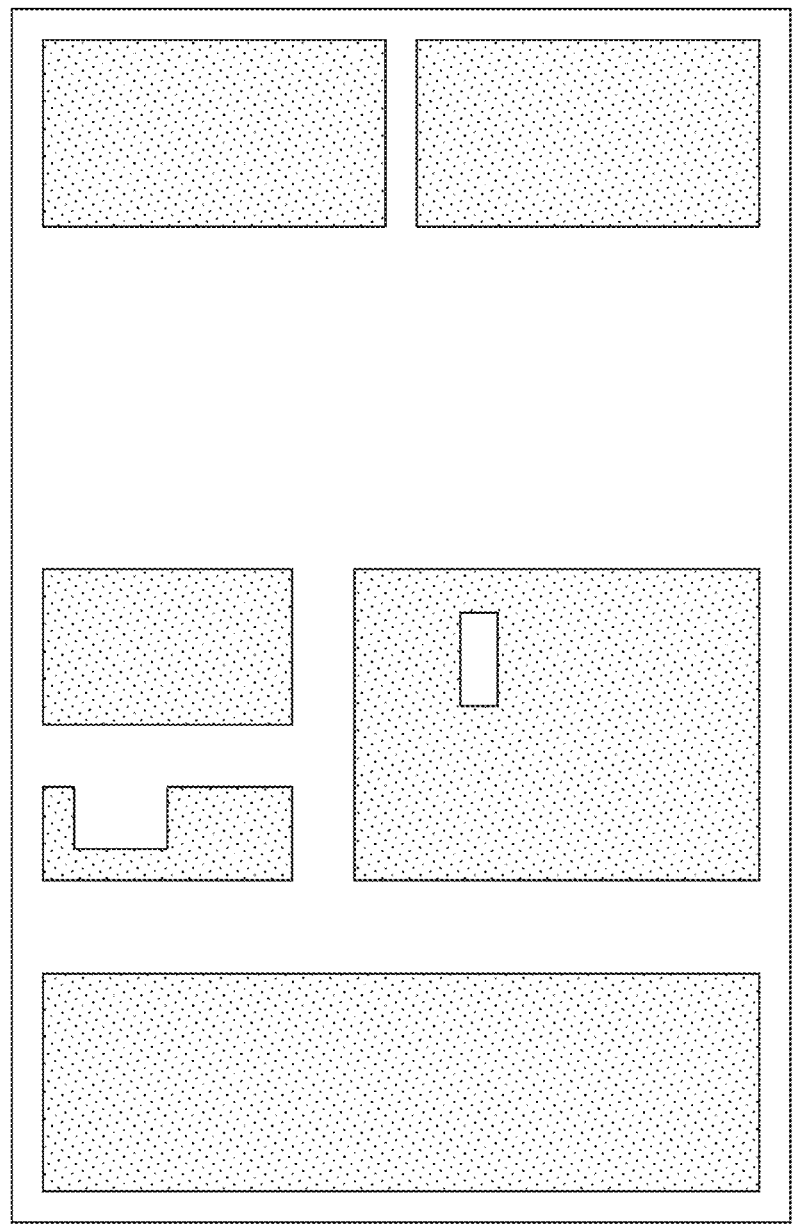
FIG. 3 illustrates an example of a previous design layout.

FIG. 3 illustrates an example of a previous design layout. For example, the previous design layout may be used to manufacture active areas in, e.g., a device such as a semiconductor device. In FIG. 3, areas filled with dots may correspond to the active areas, and areas not filled with dots may correspond to spaces.

Figure 4:
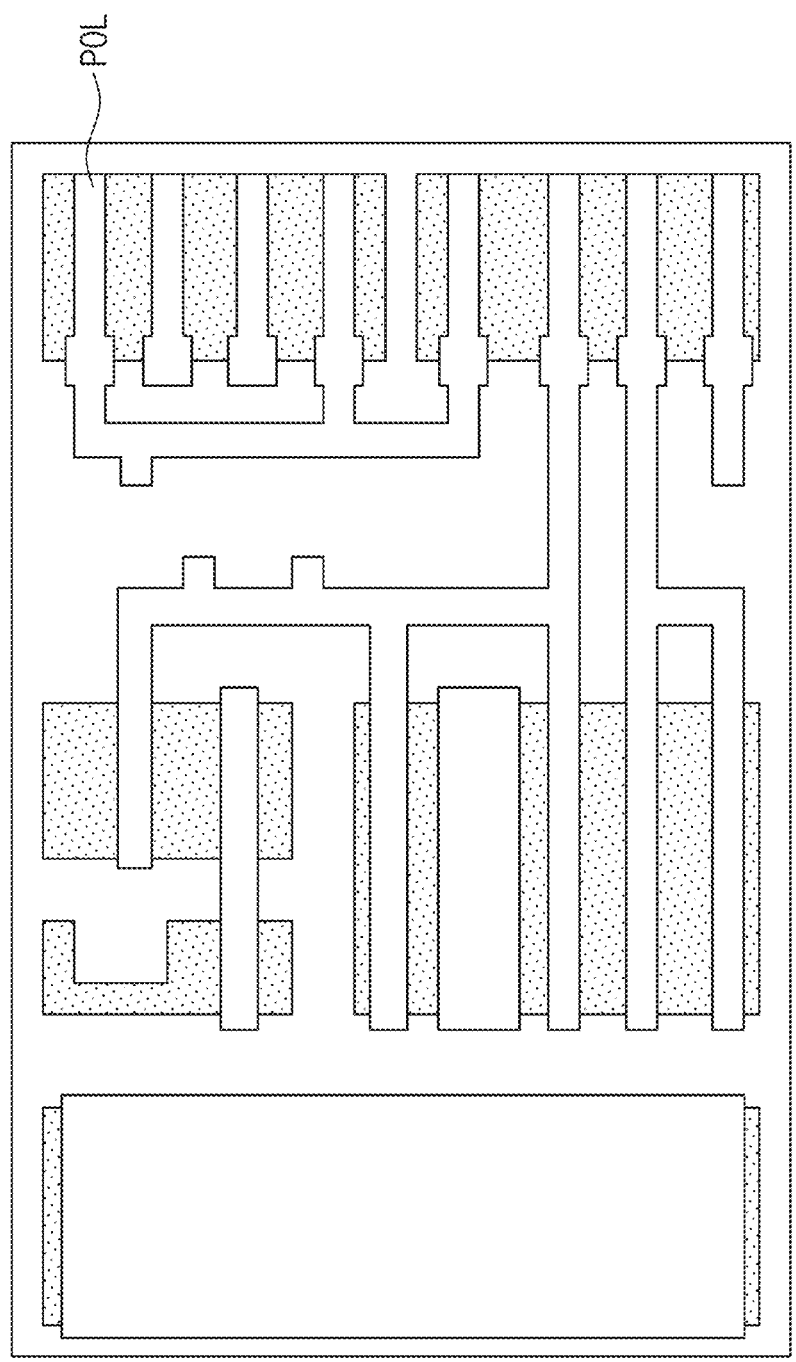
FIG. 4 illustrates an example of a current design layout.

FIG. 4 illustrates an example of a current design layout. For example, the current design layout may be used to manufacture patterns (e.g., gate patterns). The patterns may be manufactured on the active areas of the previous design layout. In FIG. 4, closed polygons indicated by "POL" (e.g., except for a rectangle surrounding the entire drawing) may correspond to the patterns and may be referred to as "polygons" on the design layout. In FIG. 4, unclosed portions (e.g., except for the rectangle surrounding the whole drawing) may correspond to spaces.

Figure 5:
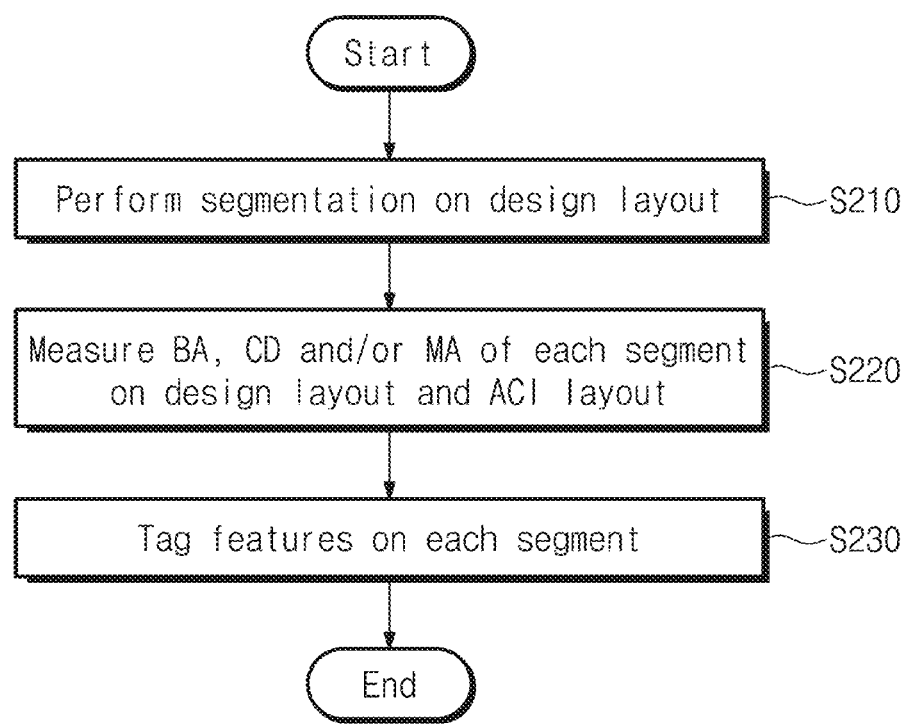
FIG. 5 is a flowchart illustrating an example in which an electronic device measures a bias(s), a critical dimension, and/or a mis-align, on a design layout and an after cleaning inspection (ACI) layer.

FIG. 5 is a flowchart illustrating an example in which the electronic device 100 measures the bias(s) BA, the critical dimension (CD), and/or the mis-align (MA), on a design layout and an after cleaning inspection (ACI) layer. Referring to FIGS. 1 and 5, the electronic device 100 may perform segmentation on the design layout. The electronic device 100 may perform segmentation to divide the design layout into a plurality of segments.

In operation S220, the electronic device 100 may measure the bias(s) BA, the critical dimension (CD), and/or the mis-align (MA) of each segment on the design layout and the after cleaning inspection (ACI) layer. For example, the electronic device 100 may sequentially select the plurality of segments and may measure the bias(s) BA, the critical dimension (CD), and/or the mis-align (MA) from the selected segment.

In operation S230, the electronic device 100 may tag features on each segment. For example, the electronic device 100 may compare the measurements and/or sequentially select the plurality of segments and may tag features on the selected segment.

Figure 6:
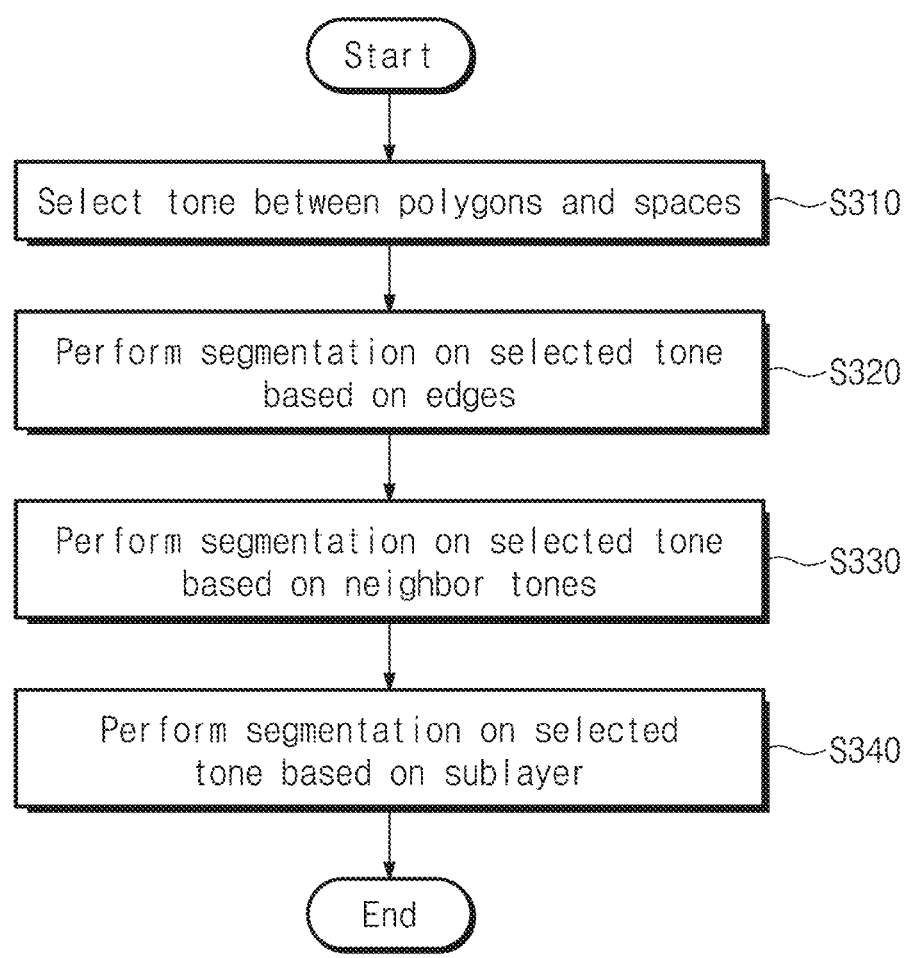
FIG. 6 is a flowchart illustrating an example of a process in which an electronic device performs segmentation.

FIG. 6 is a flowchart illustrating an example of a process in which the electronic device 100 performs segmentation. Referring to FIGS. 1 and 6, in operation S310, the electronic device 100 may select a tone of at least one polygon and/or space. For example, the electronic device 100 may select a polygon or a space as a tone targeted for PPC.

When a polygon is selected as a tone being a PPC target, segmentation may be performed on the selected tones (e.g., the polygons). When a space is selected as a tone being a PPC target, segmentation may be performed on the selected tones (e.g., spaces). For brevity and clarity of description, an example in which a polygon is selected as a tone being a PPC target will be described in the present disclosure. However, even when a space is selected as a tone being a PPC target, the learning and inference of the PPC module 200 according to some example embodiments of the present disclosure may be identically performed except that polygons are replaced with spaces.

Figure 7:
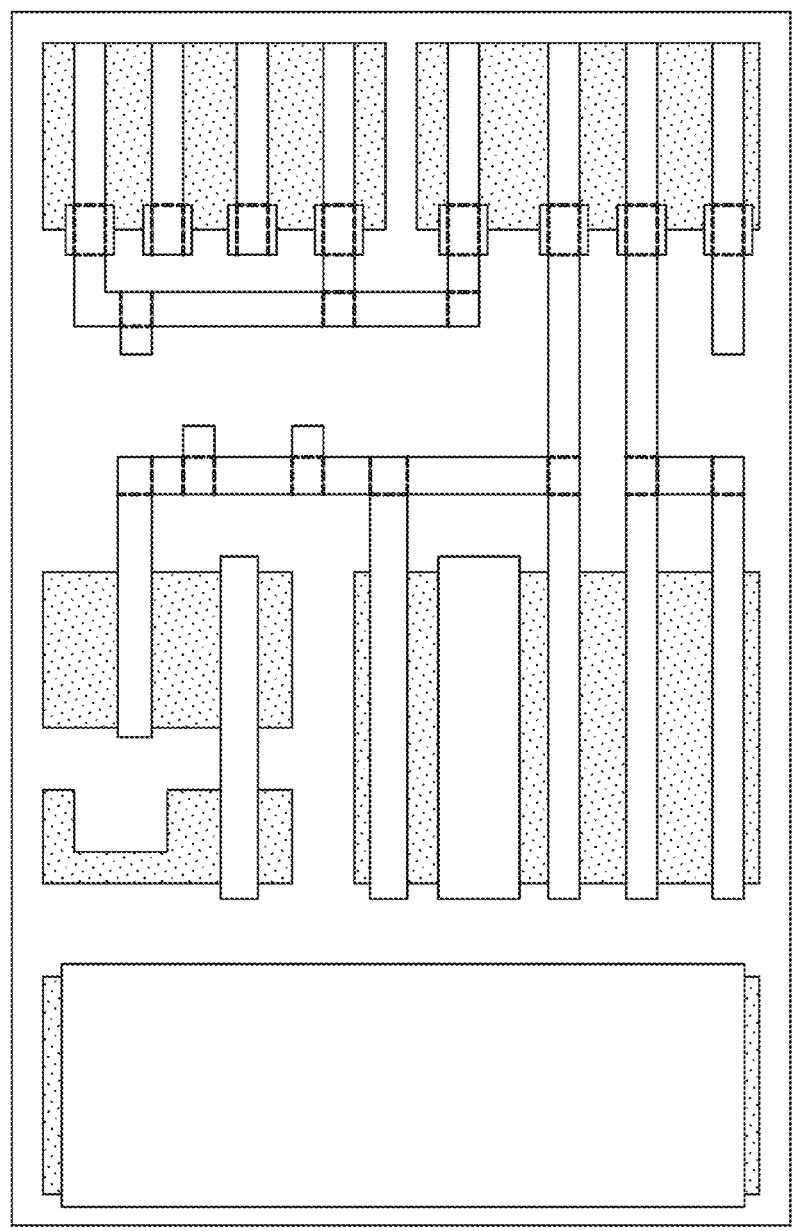
FIG. 7 illustrates an example in which segmentation is performed based on edges of a selected tone.

In operation S320, the electronic device 100 may perform segmentation on each of the selected tones (e.g., polygons) based on edges of each of the selected tones (e.g., polygons). An example in which segmentation is performed based on edges of each of selected tones (e.g., polygons) is illustrated in FIG. 7. Referring to FIG. 7, segmentation may be performed for each point at which a change of edges of each of selected tones (e.g., polygons) is made, as marked by a dotted line.

Figure 8:
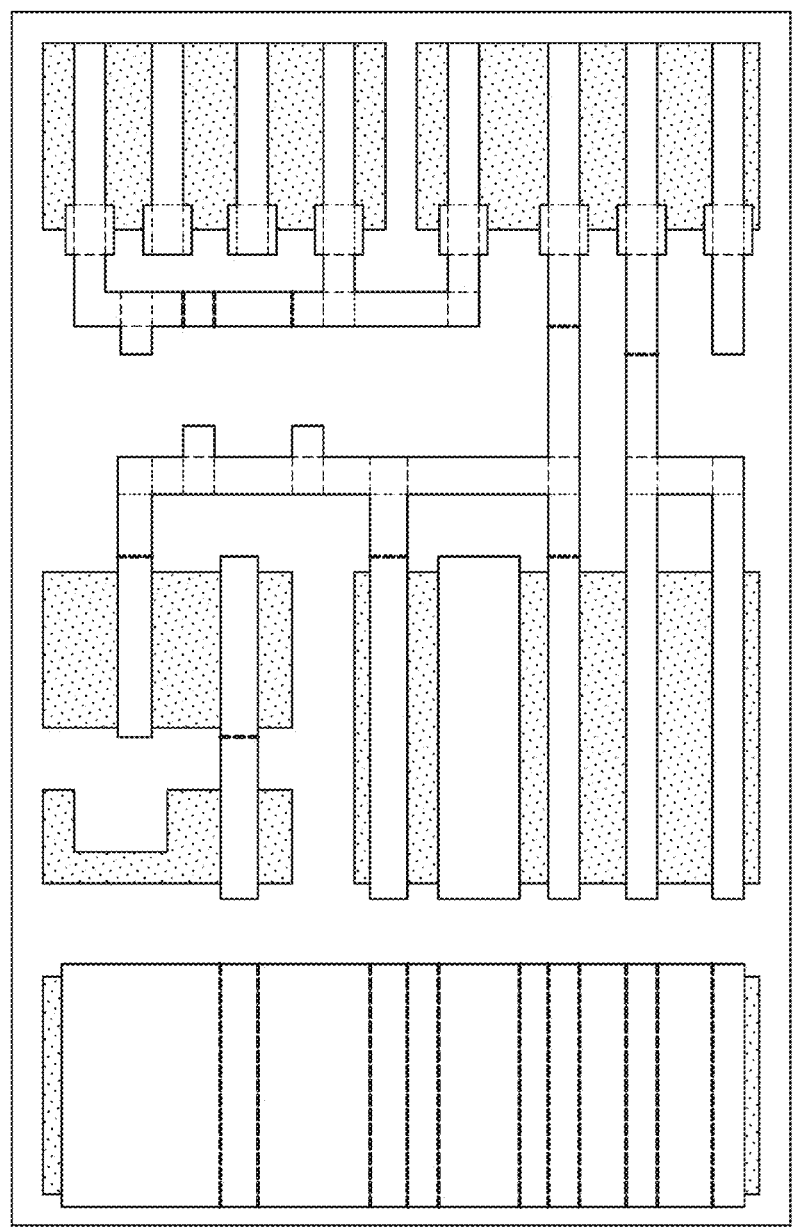
FIG. 8 illustrates an example in which segmentation is performed based on neighbor tones.

Returning to FIG. 6, in operation S330, the electronic device 100 may perform segmentation on each of the selected tones (e.g., polygons) based on neighbor tones (e.g., polygons). An example in which segmentation is performed based on neighbor tones (e.g., polygons) is illustrated in FIG. 8. Referring to FIG. 8, segmentation may be performed for each point at which a change of edges of neighbor tones (e.g., polygons) is made, as marked by a thick dashed line in each of the selected tones (e.g., polygons).

In some example embodiments, a tone (e.g., polygon) that is the closest to a specific tone (e.g., polygon) may be a first neighbor tone (e.g., a first neighbor polygon). A tone (e.g., polygon) that is the second closest to the specific tone (e.g., polygon) may be a second neighbor tone (e.g., a second neighbor polygon). The electronic device 100 may perform segmentation in response to changes of edges of n-th neighbor tones (e.g., n-th neighbor polygons) (n being a positive integer of 1 or more).

Figure 9:
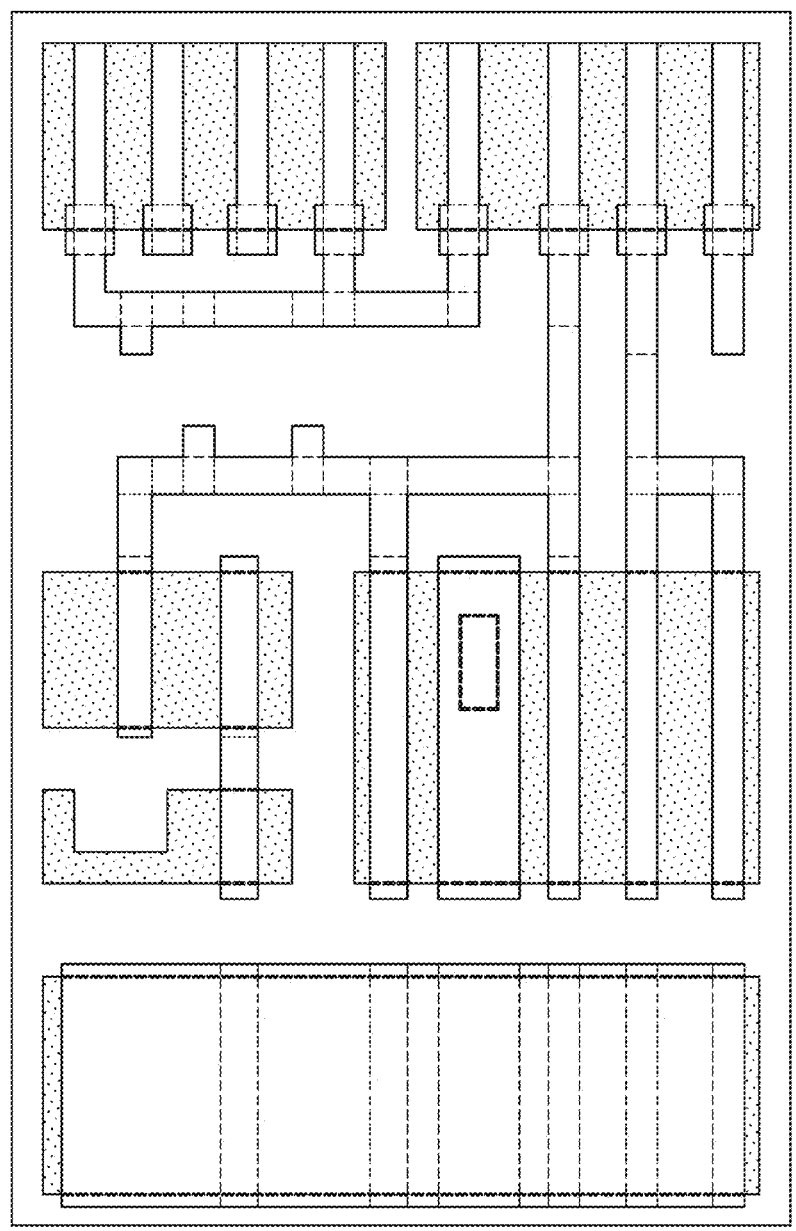
FIG. 9 illustrates an example in which segmentation is performed based on a sublayer.

Returning to FIG. 6, in operation S340, the electronic device 100 may perform segmentation on each of the selected tones (e.g., polygons) based on a sublayer. An example in which segmentation is performed based on a sublayer is illustrated in FIG. 9. Referring to FIG. 9, at a point at which a material (or feature) of a sublayer is changed, segmentation may be performed on each of the selected tones (or polygons).

Figure 10:
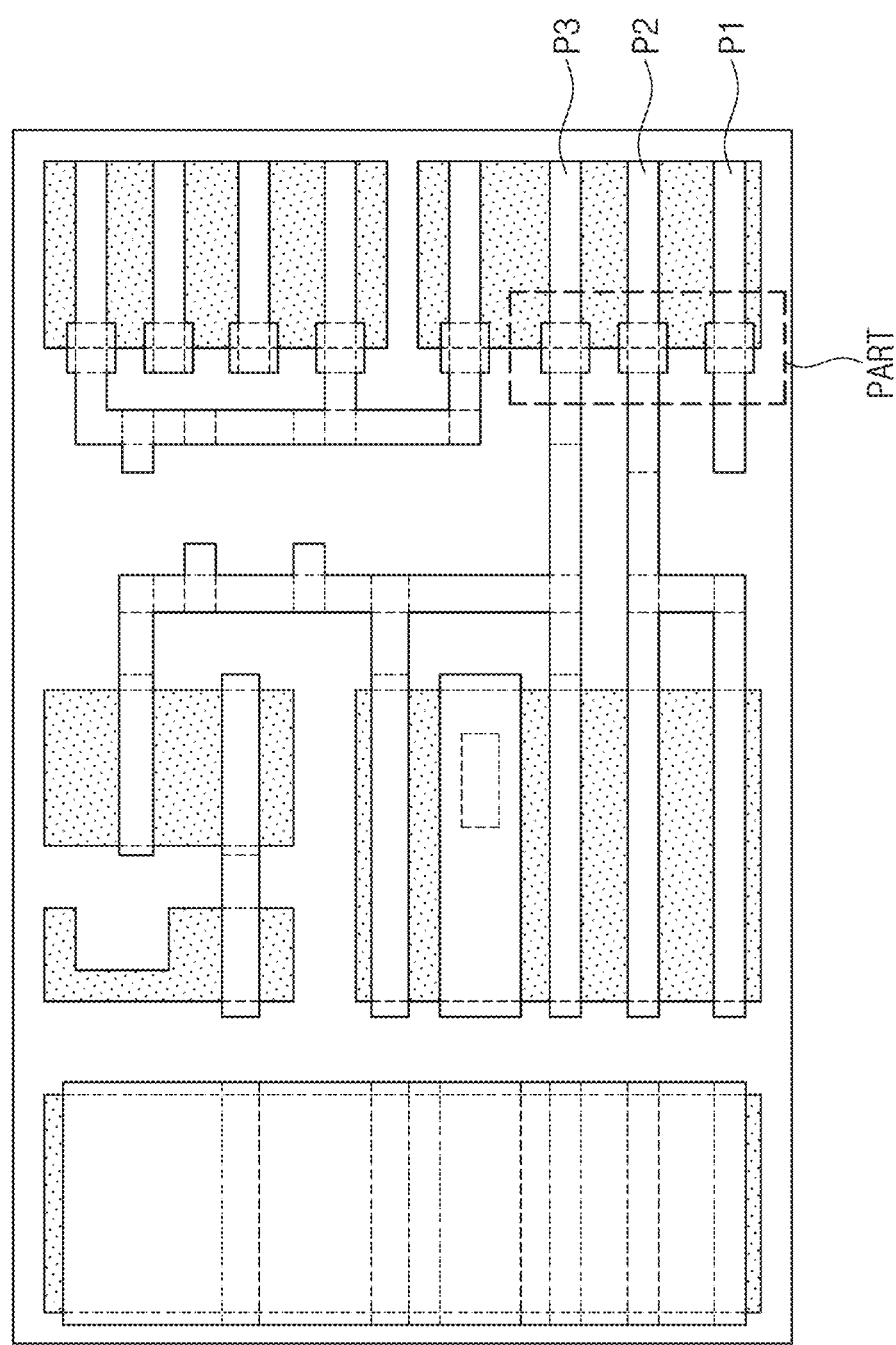
FIG. 10 illustrates an example in which segmentation associated with a design layout is completed.

FIG. 10 illustrates an example in which segmentation associated with a design layout is completed. Among segments of FIG. 10, an example of measuring the bias(s) BA, the critical dimension CD, and/or the mis-align MA will be described with reference to a partial layout PART including a portion of a first polygon P1, a portion of a second polygon P2, and a portion of a third polygon P3.

Figure 11:
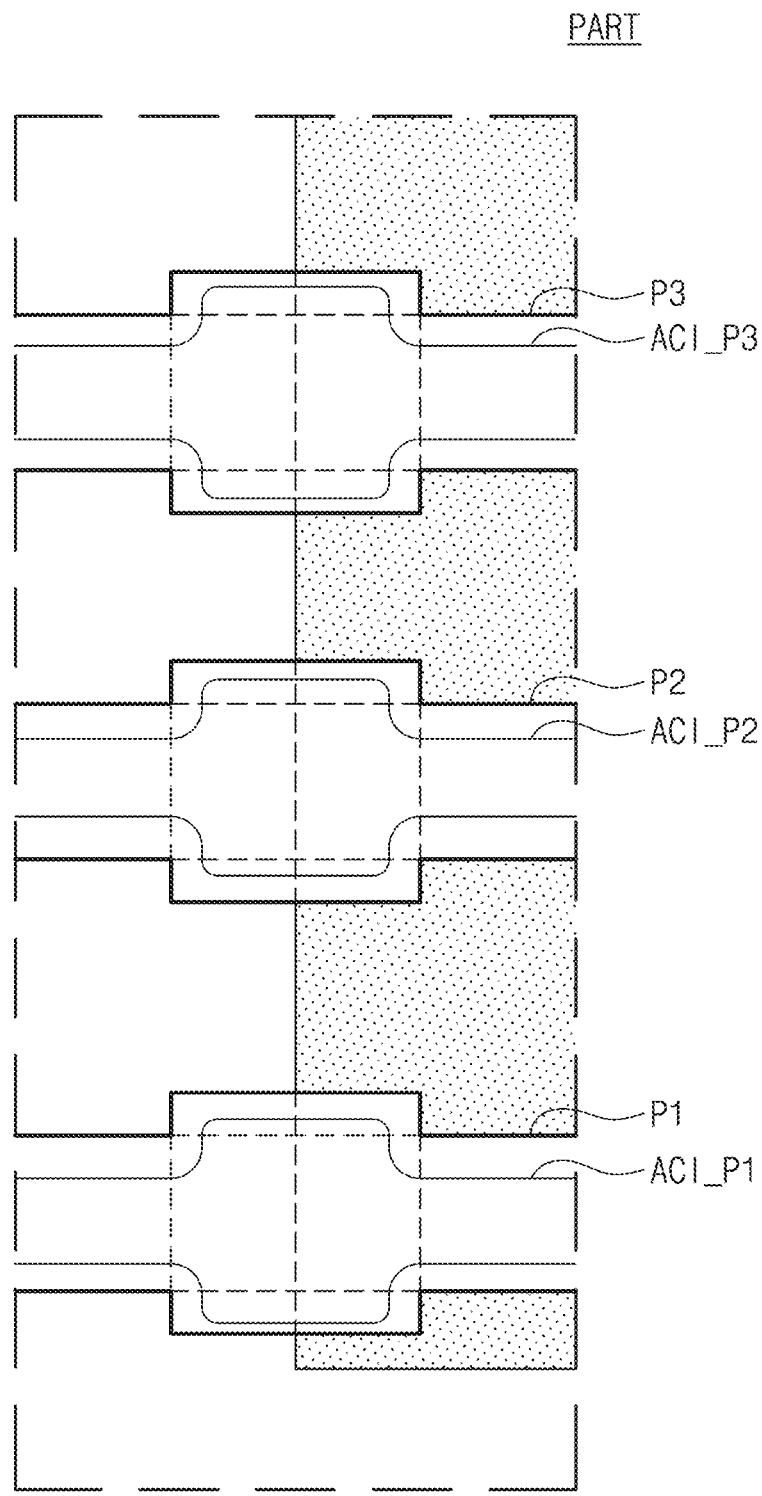
FIG. 11 illustrates a partial layout including a portion of a first polygon, a portion of a second polygon, and a portion of a third polygon.

FIG. 11 illustrates the partial layout PART including a portion of the first polygon P1, a portion of the second polygon P2, and a portion of the third polygon P3. A first ACI layout polygon ACI_P1 corresponding to the first polygon P1, a second ACI layout polygon ACI_P2 corresponding to the second polygon P2, and a third ACI layout polygon ACI_P3 corresponding to the third polygon P3 are illustrated together in FIG. 11.

Referring to FIGS. 1 and 11, shapes of the first ACI layout polygon ACI_P1, the second ACI layout polygon ACI_P2, and the third ACI layout polygon ACI_P3 of the ACI layout may be different from shapes of the first polygon P1, the second polygon P2, and the third polygon P3 of the design layout.

The PPC may include an operation of generating a layout adjusted by correcting the design layout such that the shapes of the first ACI layout polygon ACI_P1, the second ACI layout polygon ACI_P2, and the third ACI layout polygon ACI_P3 of the ACI layout are identical or similar to the shapes of the first polygon P1, the second polygon P2, and the third polygon P3 of the design layout. The adjusted layout (including the design layout), the ACI layout, and features associated therewith may be collected to train the PPC module 200 such that the ACI layout is generated from the adjusted layout (including the design layout).

Figure 12:
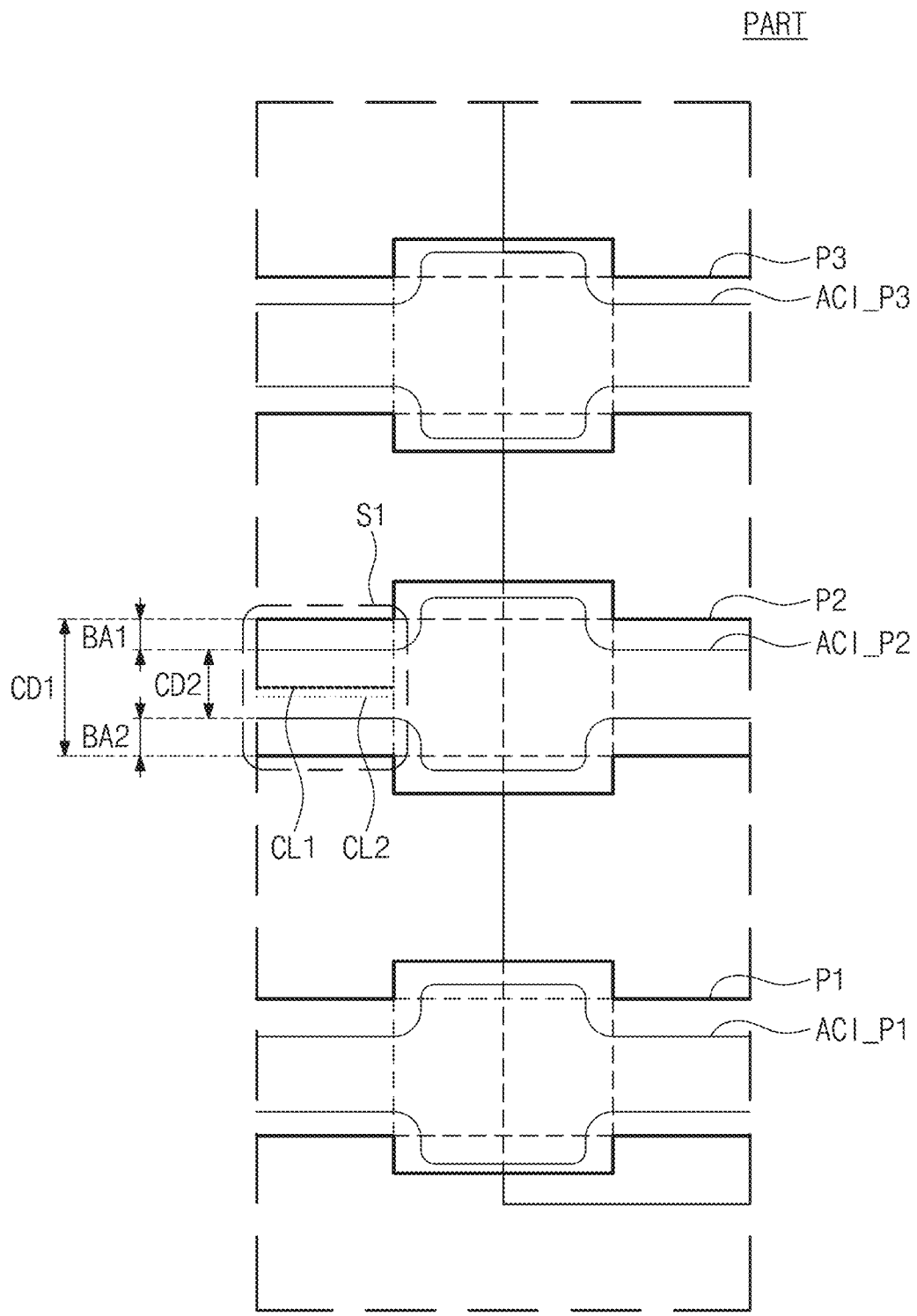
FIG. 12 illustrates examples of measuring a bias(s), a critical dimension, and/or a mis-align from a second polygon and a second ACI layout polygon ACI.

FIG. 12 illustrates examples of measuring the bias(s) BA, the critical dimension CD, and/or the mis-align MA from the second polygon P2 and the second ACI layout polygon ACI_P2. Referring to FIGS. 1 and 12, in each segment, differences (or distances) between edges (e.g., edges adjacent to spaces) of a polygon (e.g., the second polygon P2) of the design layout and edges (e.g., edges adjacent to spaces) of a polygon (e.g., the second ACI layout polygon ACI_P2 of the ACI layout) may be measured as the bias(s) BA (e.g., a first bias BA1 and a second bias BA2).

In each segment, a width (e.g., CD1) of a polygon (e.g., the second polygon P2) of the design layout and a width (e.g., CD2) of a polygon (e.g., the second ACI layout polygon ACI_P2) and/or a difference therebetween may be measured as the critical dimension CD. In some example embodiments, in the case where the critical dimension CD is measured without separately measuring the bias(s) BA, the electronic device 100 may equally divide the difference between the first critical dimension CD1 and the second critical dimension CD2 so as to be used as a bias(s).

In each segment, a centerline (e.g., CL1) of a polygon (e.g., the second polygon P2) of the design layout and a centerline (e.g., CL2) of a polygon (e.g., the second ACI layout polygon ACI_P2) and/or a difference therebetween may be measured as the mis-align MA. Alternatively, in each segment, a difference between the biases (e.g., the first bias BA1 and the second bias BA2) may be measured as the mis-align MA.

Figure 13:
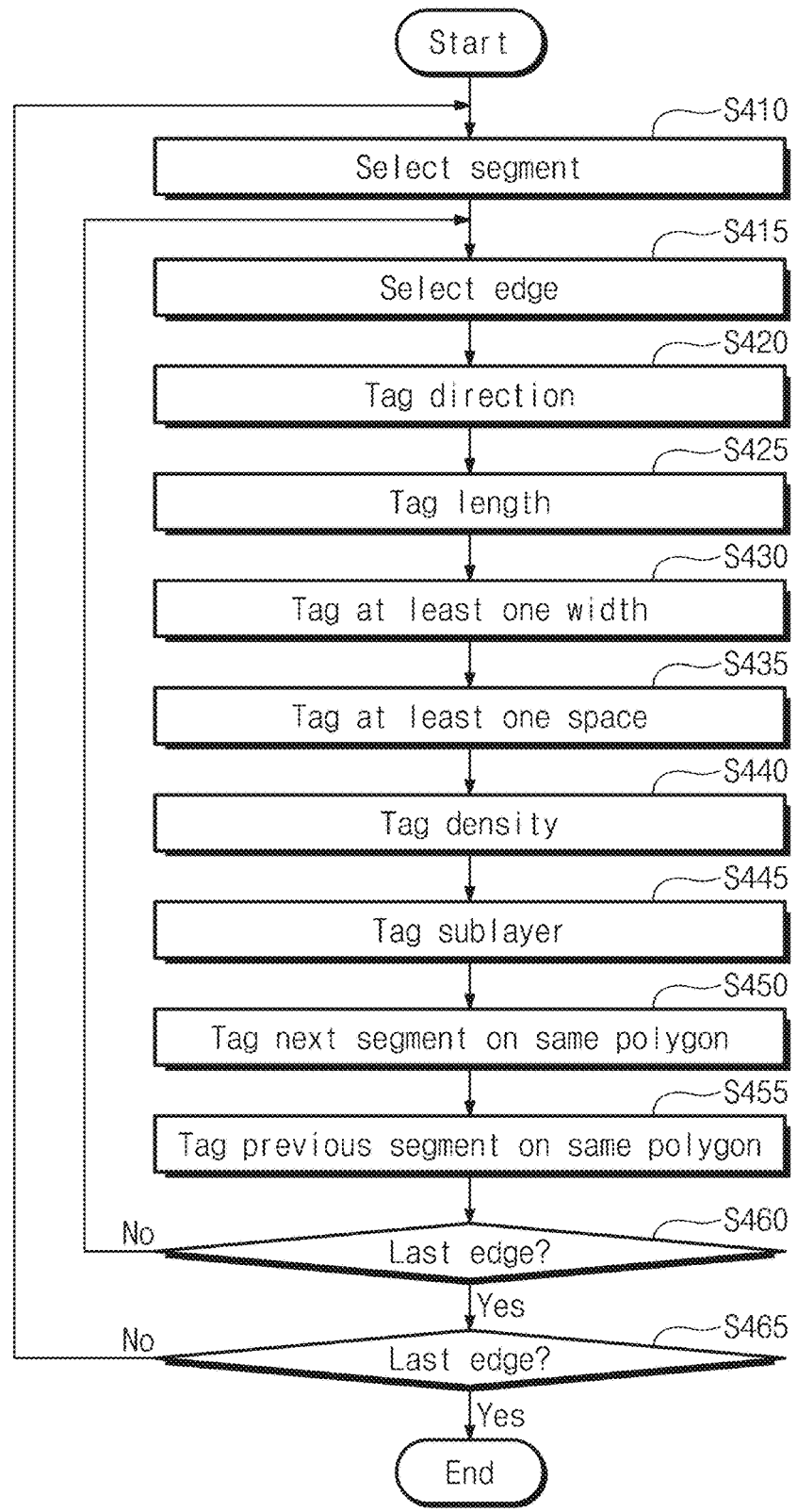
FIG. 13 is a flowchart illustrating an example of a process in which an electronic device tags features on each segment.
Figure 14:
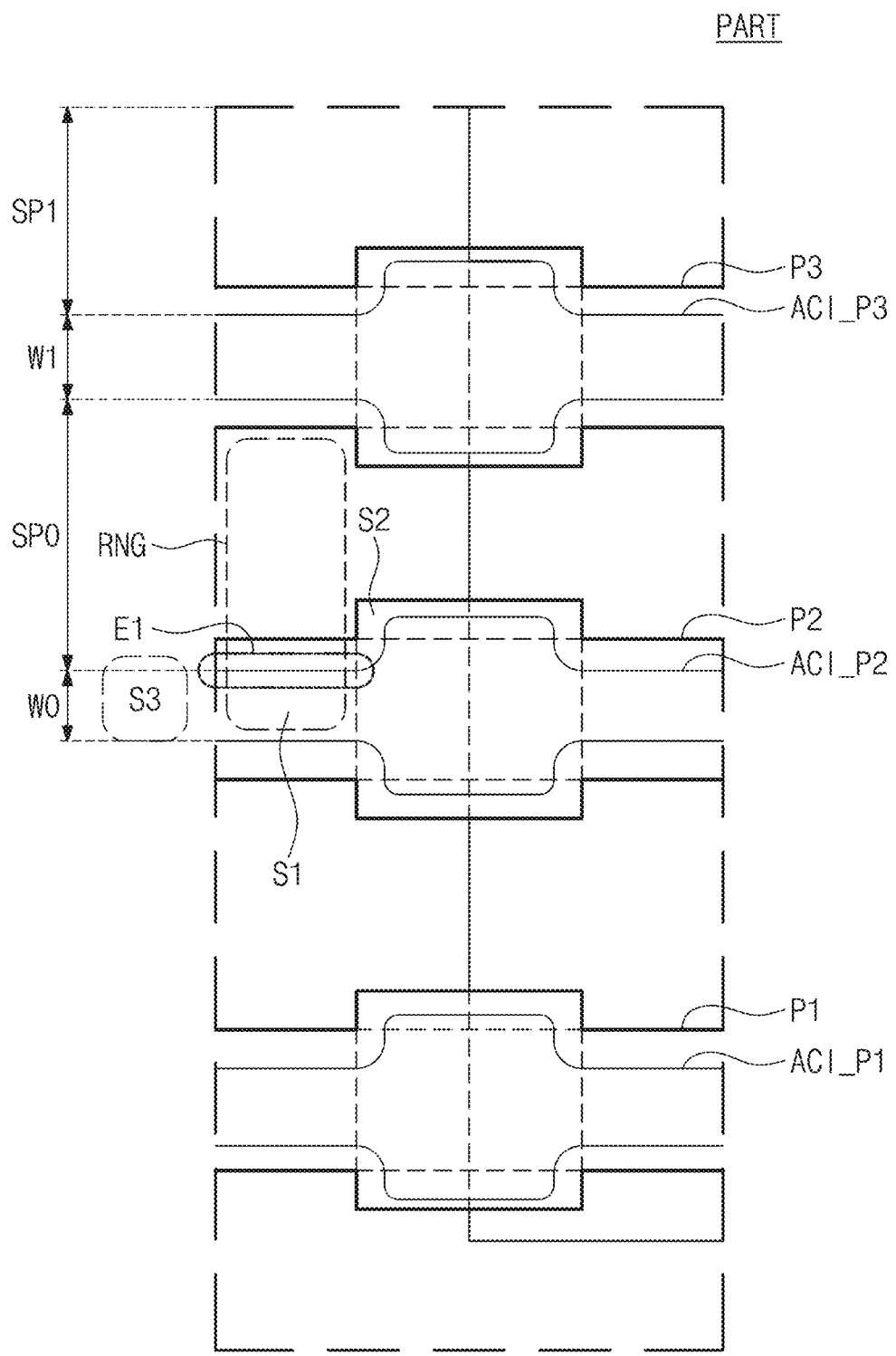
FIG. 14 illustrates an example in which features are tagged on a first segment.

FIG. 13 is a flowchart illustrating an example of a process in which the electronic device 100 tags features on each segment. FIG. 14 illustrates an example in which features are tagged on a first segment S1. Referring to FIGS. 1, 13, and 14, the features include at least a width, a space and a length. In operation S410, the electronic device 100 may select a segment. For example, the electronic device 100 may select the first segment S1.

In operation S415, the electronic device 100 may select at least one of the edges of a selected tone of the ACI layout (e.g., an edge which belongs to the first segment S1 thus selected). For example, the electronic device 100 may select a first edge E1 in an upward direction of the ACI layout, which belongs to the first segment S1.

In operation S420, the electronic device 100 may tag a direction on the selected first edge E1 of the selected first segment S1. The direction may indicate a direction of an edge and may be one of an upward direction, a downward direction, a left direction, a right direction, and/or a combination thereof. In some example embodiments, the "upward direction" may be tagged on the first edge E1 of the first segment S1.

In operation S425, the electronic device 100 may tag a length on the selected first edge E1 of the selected first segment S1.

In operation S430, the electronic device 100 may tag at least one width on the selected first edge E1 of the selected first segment S1. For example, the electronic device 100 may tag a length in a direction perpendicular to the first edge E1 with a 0-th width W0, in a polygon to which the first edge E1 belongs. The electronic device 100 may further tag a width of at least one neighbor segment (or polygon). For example, the electronic device 100 may tag a length according to a direction of the first edge E1 of an ACI layout polygon (e.g., the third ACI layout polygon ACI_P3) the closest thereto in the direction of the first edge E1, that is, the upward direction, on the selected first edge E1 of the selected first segment S1 with a first width W1.

The electronic device 100 may additionally tag a width of an ACI layout polygon the second closest thereto in the direction of the first edge E1, that is, the upward direction, a width of an ACI layout polygon the third closest thereto in the upward direction, and the like, on the selected first edge E1 of the selected first segment S1.

In operation S435, the electronic device 100 may tag at least one space on the selected first edge E1 of the selected first segment S1. For example, the electronic device 100 may tag a length in a direction perpendicular to the first edge E1 with a 0-th space SP0, in a space adjacent to the first edge E1. The electronic device 100 may further tag at least one neighbor space. For example, the electronic device 100 may tag a length according to a direction of the first edge E1 of a space second adjacent thereto in the direction of the first edge E1, that is, the upward direction, on the selected first edge E1 of the selected first segment S1 with a first space SP1.

The electronic device 100 may additionally tag a space of an ACI layout third adjacent thereto in the direction of the first edge E1, that is, the upward direction, a space of an ACI layout fourth adjacent thereto in the upward direction, and the like, on the selected first edge E1 of the selected first segment S1.

In operation S440, the electronic device 100 may tag a density on the selected first edge E1 of the selected first segment S1. For example, the electronic device 100 may tag a density of polygons belonging to a specific range (e.g., RNG) in a direction of the selected first edge E1, that is, the upward direction, on the selected first edge E1 of the selected first segment S1. The range RNG is illustrated in FIG. 14 as an example, but the size of the range RNG is not limited thereto.

In operation S445, the electronic device 100 may tag a sublayer on the selected first edge E1 of the selected first segment S1. For example, the electronic device 100 may tag features (e.g., boundaries of different materials and kinds of the materials) of a sublayer belonging to the specific range (e.g., RNG) in the direction of the selected first edge E1, that is, the upward direction, on the selected first edge E1 of the selected first segment S1. The range RNG is illustrated in FIG. 14 as an example, but the size of the range RNG is not limited thereto. Also, the range tagging the features of the sublayer may be different from the range tagging the density.

In operation S450, the electronic device 100 may tag features of a next segment in a counterclockwise direction in the same polygon, on the selected first edge E1 of the selected first segment S1. For example, as illustrated in FIG. 14, features of a segment (e.g., a third segment S3) located in the counterclockwise direction of the first segment S1 may be tagged on the selected first edge E1 of the selected first segment S1. For example, a direction, a length, at least one width, at least one space, a density, and features of a sublayer of the third segment S3 may be tagged on the selected first edge E1 of the selected first segment S1.

In operation S455, the electronic device 100 may tag features of a previous segment in a counterclockwise direction in the same polygon, on the selected first edge E1 of the selected first segment S1. For example, as illustrated in FIG. 14, features of a segment (e.g., a second segment S2) located in a clockwise (or counterclockwise) direction of the first segment S1 may be tagged on the selected first edge E1 of the selected first segment S1. For example, a direction, a length, at least one width, at least one space, a density, and features of a sublayer of the second segment S2 may be tagged on the selected first edge E1 of the selected first segment S1.

In operation S460, the electronic device 100 may determine whether the selected first edge E1 of the selected first segment S1 is the last edge. For example, the electronic device 100 may determine whether the tagging of features on all edges of the selected first segment S1 is completed. Alternatively, the electronic device 100 may determine whether the tagging of features on all edges contacting a space from among the edges of the selected first segment S1 is completed.

When the selected first edge E1 is not the last edge, in operation S415, the electronic device 100 may select a next edge of the selected first segment S1 and may perform the tagging in operation S420 to operation S455. When the selected first edge E1 is the last edge, operation S465 may be performed.

In operation S465, the electronic device 100 may determine whether the selected first segment S1 is the last segment. For example, the electronic device 100 may determine whether the tagging of features on all segments of the ACI layout is completed. Alternatively, the electronic device 100 may determine whether the tagging of features on segments contacting a space from among the segments of the ACI layout is completed.

When the selected first segment S1 is not the last segment, in operation S410, a next segment may be selected. Afterwards, the tagging may be performed in operation S415 to operation S460. When the selected first segment S1 is the last segment, tagging may be terminated. In an embodiment, features may be tagged on segments contacting a space. Alternatively, features may be tagged on segments contacting a space and segments not contacting the space.

Figure 15:
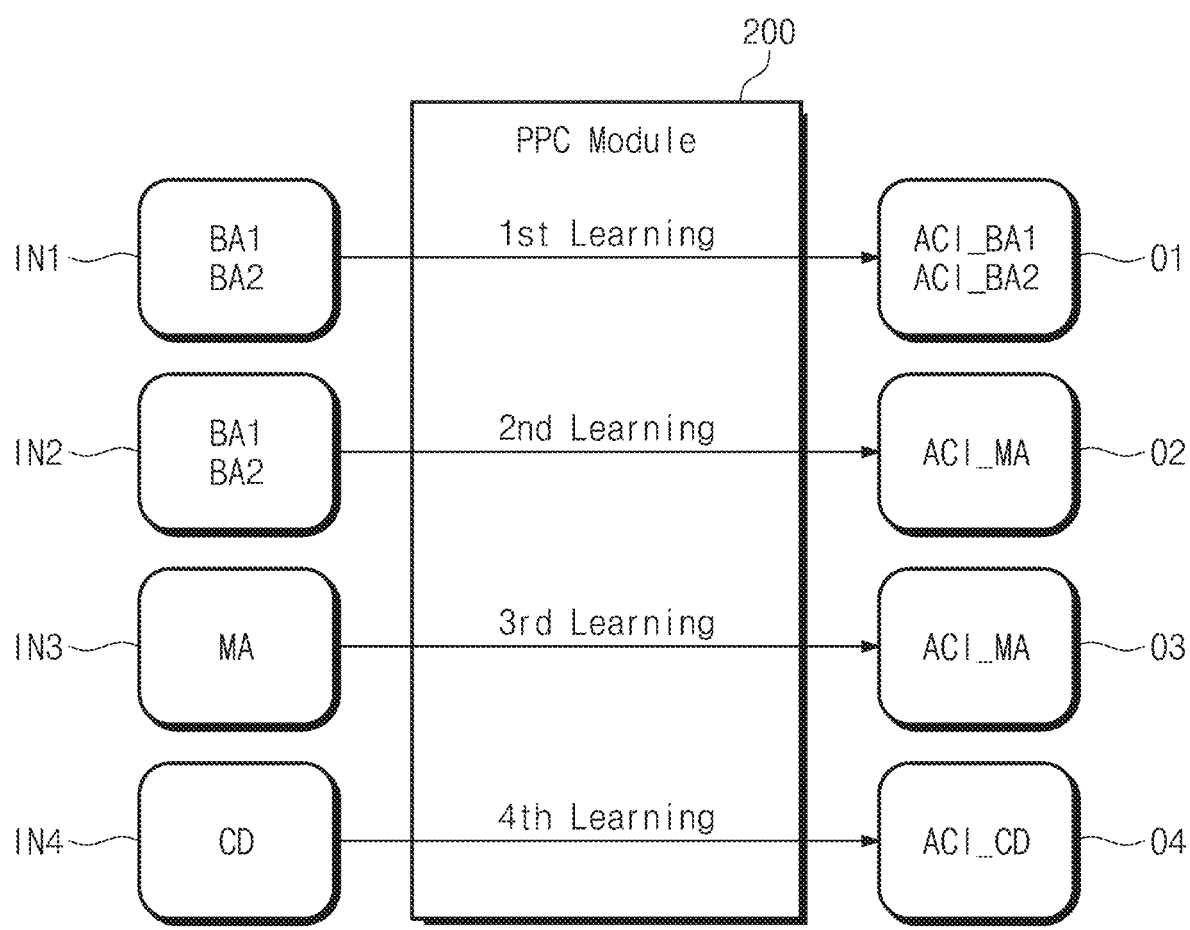
FIG. 15 illustrates an example of training a PPC module.

FIG. 15 illustrates an example of training the PPC module 200. Referring to FIGS. 1 and 15, the electronic device 100 may train the PPC module 200 through at least one of first learning, second learning, third learning, and fourth learning.

As an example of the first learning, the electronic device 100 may train the PPC module 200 such that a first ACI layout bias ACI_BA1 and a second ACI layout bias ACI_BA2 of each segment of the ACI layout are inferred from a first input IN1 including a first bias BA1 and a second bias BA2 of each segment of an input layout. The input layout may be a design layout and/or a layout adjusted from the design layout.

The first bias BA1 of each segment of the input layout may be a first bias BA1 between each segment of the input layout and a corresponding segment of the design layout. The second bias BA2 of each segment of the input layout may be a second bias BA2 between each segment of the input layout and a corresponding segment of the design layout. The first bias BA1 and the second bias BA2 of each segment of the input layout may be measured by comparing the polygons P1, P2, and P3 of the design layout with polygons of the input layout instead of the ACI layout polygons ACI_P1, ACI_P2, and ACI_P3 in the example described with reference to FIG. 12.

The PPC module 200 may be trained to infer the first ACI layout bias ACI_BA1 and the second ACI layout bias ACI_BA2 of each segment of the ACI layout based on the first bias BA1 and the second bias BA2 of each segment of the input layout, and features tagged on each segment.

As an example of the second learning, the electronic device 100 may train the PPC module 200 such that a mis-align MA of each segment of the ACI layout are inferred from a second input IN2 including the first bias BA1 and the second bias BA2 of each segment of the input layout. The PPC module 200 may be trained to infer the mis-align MA of each segment of the ACI layout based on the first bias BA1 and the second bias BA2 of each segment of the input layout, and the features tagged on each segment.

As an example of the third learning, the electronic device 100 may train the PPC module 200 such that an ACI layout mis-align ACI_MA of each segment of the ACI layout is inferred from a third input IN3 including the mis-align MA of each segment of the input layout. The input layout may be the design layout and/or a layout adjusted from the design layout.

The mis-align MA of each segment of the input layout may be a mis-align MA between each segment of the input layout and a corresponding segment of the design layout. The mis-align MA of each segment of the input layout may be measured by comparing the polygons P1, P2, and P3 of the design layout with the polygons of the input layout instead of the ACI layout polygons ACI_P1, ACI_P2, and ACI_P3 in the example described with reference to FIG. 12.

The PPC module 200 may be trained to infer the ACI layout mis-align ACI_MA of each segment of the ACI layout based on the mis-align MA of each segment of the input layout, and the features tagged on each segment.

As an example of the fourth learning, the electronic device 100 may train the PPC module 200 such that an ACI layout critical dimension ACI_CD of each segment of the ACI layout is inferred from a fourth input IN4 including the critical dimension CD of each segment of the input layout. The input layout may be the design layout and/or a layout adjusted from the design layout.

The PPC module 200 may be trained to infer the ACI layout critical dimension ACI_CD of each segment of the ACI layout based on the critical dimension CD of each segment of the input layout, and the features tagged on each segment.

An example in which the PPC module 200 performs learning by using one of the bias(s) BA, the mis-align MA, and the critical dimension CD as an input is described, but the PPC module 200 may perform learning by using combinations of two or more of the bias(s) BA, the mis-align MA, and the critical dimension CD as an input. Also, an example in which the PPC module 200 performs learning by using one of the ACI layout bias(s) ACI_BA, the ACI layout mis-align ACI_MA, and the ACI layout critical dimension ACI_CD as an output, but the PPC module 200 may perform learning by using combinations of two or more of the ACI layout bias(s) ACI_BA, the ACI layout mis-align ACI_MA, and the ACI layout critical dimension ACI_CD as an output.

Figure 16:
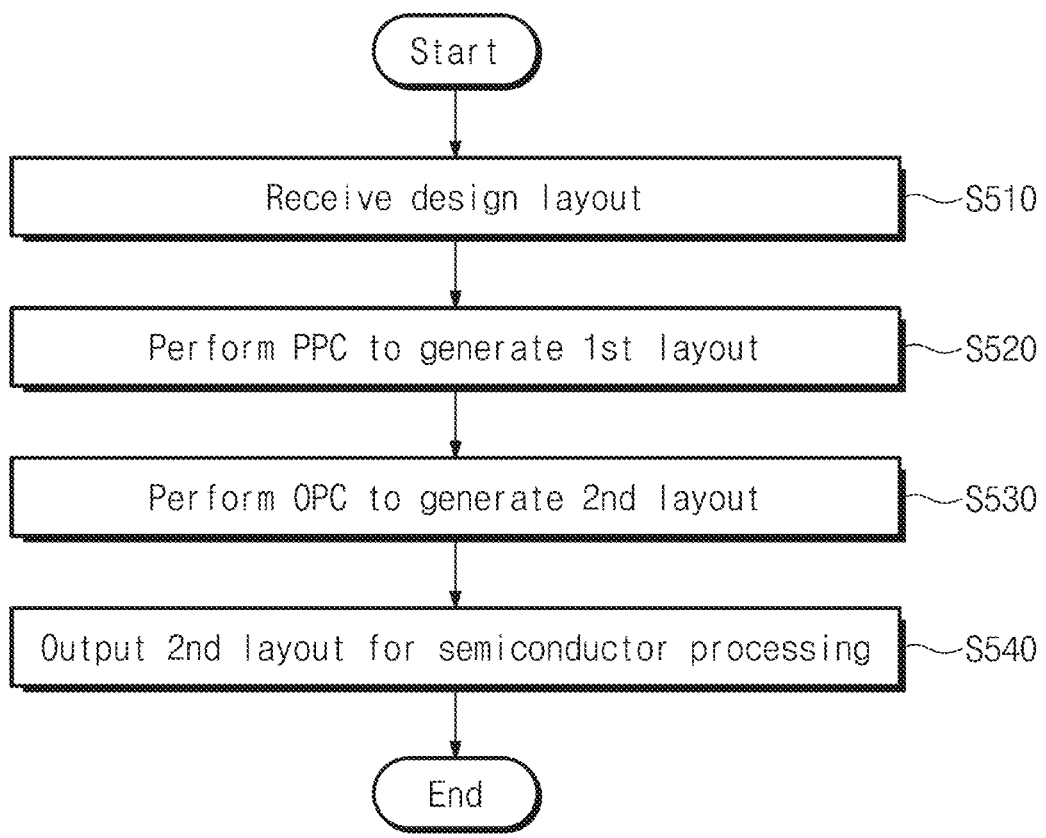
FIG. 16 is a flowchart illustrating an example in which an electronic device performs PPC by using a PPC module whose learning is completed.

FIG. 16 is a flowchart illustrating an example in which the electronic device 100 performs PPC by using the PPC module 200 whose learning is completed. Referring to FIGS. 1 and 16, in operation S510, the electronic device 100 may receive a design layout. For example, the electronic device 100 may receive the design layout by using a wired or wireless interface through the modem 150. Alternatively, the electronic device 100 may receive the design layout through a removable storage device implemented as a part of the storage device 140.

In operation S520, the electronic device 100 may perform PPC on the received design layout (e.g., using the PPC module 200) and may generate a first layout. In operation S530, the electronic device 100 may perform OPC on the first layout to generate a second layout. The OPC may be performed based on a simulation program coded to generate the second layout from the first layout and/or on a machine learning-based module trained to infer the second layout from the first layout.

In operation S540, the electronic device 100 may output the second layout for semiconductor processing. For example, the electronic device 100 may output the second layout to a semiconductor manufacturing device implemented to manufacture a semiconductor device by using various materials. The semiconductor manufacturing device may manufacture a semiconductor device by using the second layout.

For example, the semiconductor manufacturing device may manufacture a semiconductor device by using extreme ultraviolet (EUV). A wavelength of the extreme ultraviolet may range from 4 nm to 124 nm. In some example embodiments, the semiconductor manufacturing device may use the extreme ultraviolet having a wavelength ranging from 4 nm to 20 nm. For example, the semiconductor manufacturing device may use the extreme ultraviolet having a wavelength of 13.5 nm.

Figure 17:
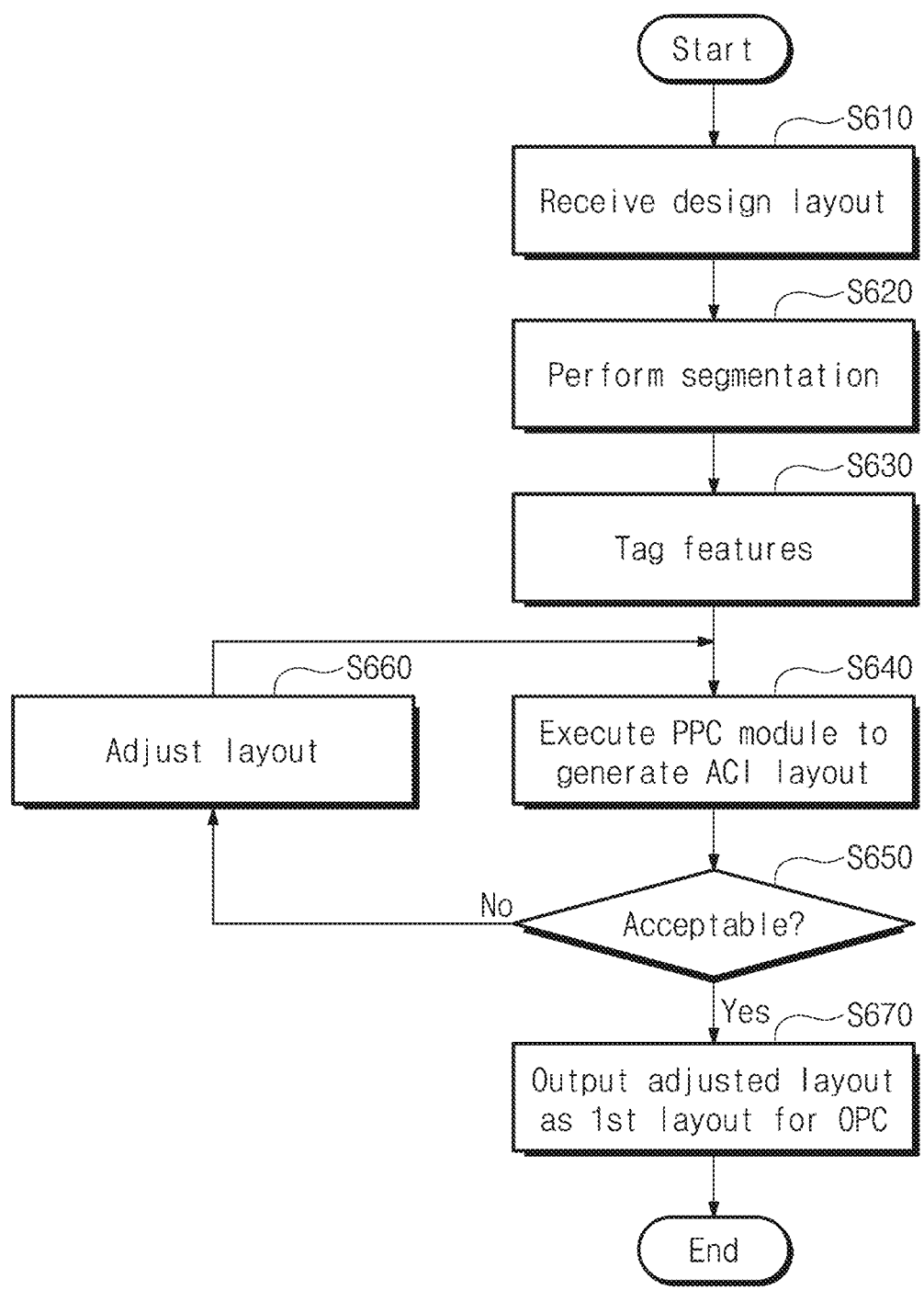
FIG. 17 is a flowchart illustrating an example in which an electronic device performs PPC by using a PPC module.

FIG. 17 illustrates an example in which the electronic device 100 performs PPC by using the PPC module 200. Referring to FIGS. 1 and 17, in operation S610, the electronic device 100 may receive a design layout. In operation S620, the electronic device 100 may perform segmentation on the input layout. For example, the electronic device 100 may perform segmentation on a design layout as described with reference to FIGS. 6 to 9.

In operation S630, the electronic device 100 may tag features on each segment of the design layout. For example, the electronic device 100 may tag features on each segment of the design layout as described with reference to FIGS. 13 to 14.

In operation S640, the electronic device 100 may execute the PPC module 200 to generate an ACI layout. For example, in the beginning, the electronic device 100 may generate the ACI layout by inputting an input layout (e.g., a design layout in the beginning and then an adjusted layout) including segments and features tagged on each segment to the PPC module 200.

In operation S650, the electronic device 100 may determine whether the generated ACI layout is acceptable. For example, when the generated ACI layout is identical to the design layout and/or when a difference between the generated ACI layout and the design layout is smaller than or equal to a threshold value the electronic device 100 may determine that the generated ACI layout is acceptable.

For example, when a ratio of an area, which does not overlap the design layout in a selected tone of the ACI layout, to the total area of a selected tone of the design layout is smaller than a threshold value, the ACI layout may be acceptable. Alternatively, when a difference (e.g., an average difference or a total difference) of segments of the design layout and corresponding ACI layouts (e.g., a ratio of a non-overlapping area to an area of a selected tone) is smaller than a threshold value, the ACI layout may be acceptable.

When the ACI layout is not acceptable, in operation S660, the electronic device 100 may adjust the input layout of the PPC module 200. In the beginning, the input layout may be the design layout. For example, the electronic device 100 may generate an adjusted layout by adjusting the bias(s) BA, the mis-align MA, and/or the critical dimension CD of each segment of the input layout (the design layout in the beginning and then the adjusted layout). For example, the electronic device 100 may adjust the input layout such that the ACI layout is closer to the design layout.

Afterwards, the electronic device 100 may again perform operation S640 and operation S660. Operation S640 to operation S660 through which a layout is adjusted may be repeated until a difference between the design layout and the ACI layout is acceptable.

When the difference between the design layout and the ACI layout is acceptable, operation S670 may be performed. In operation S670, the electronic device 100 may output the input layout of the PPC module 200 e.g., the adjusted layout may be output as a first layout for OPC.

Figure 18:
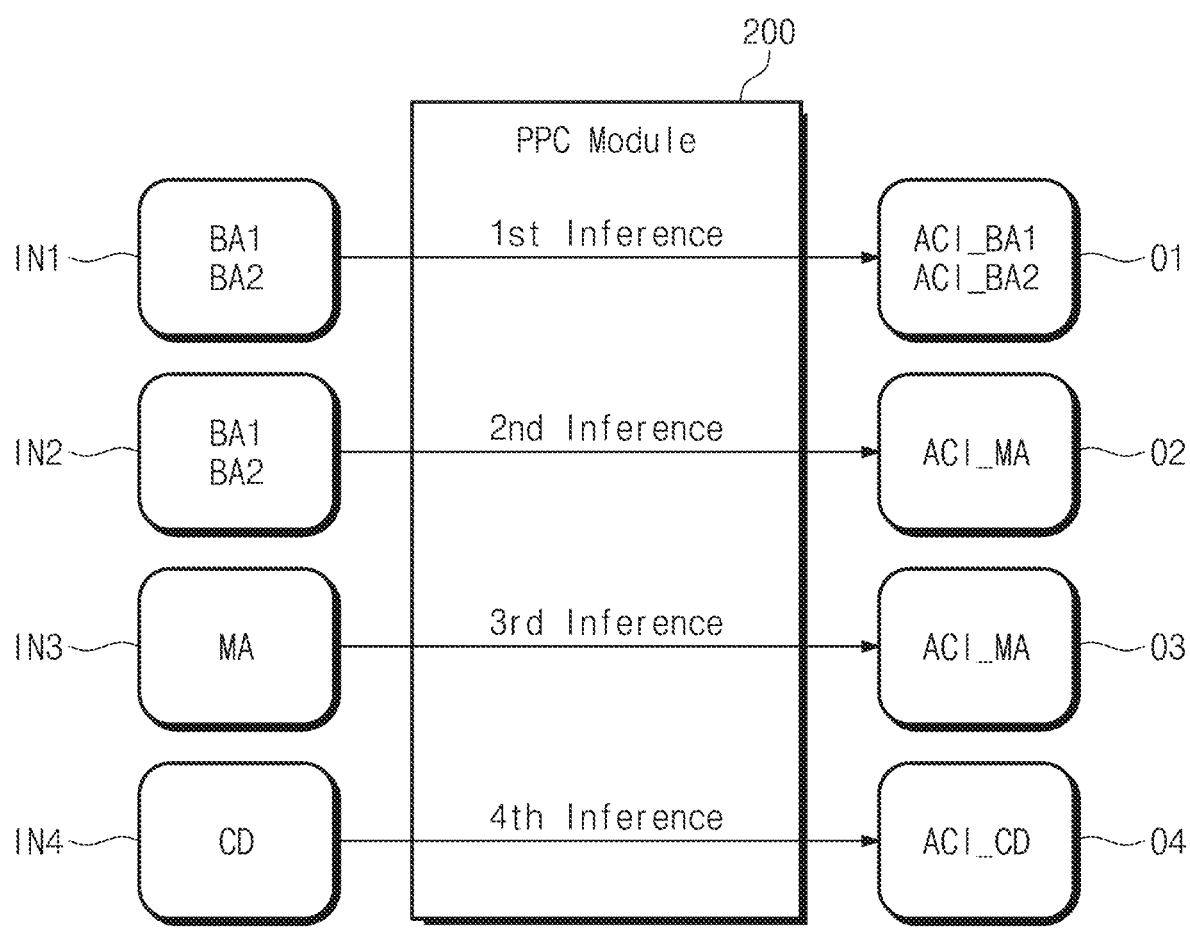
FIG. 18 illustrates an example of inferring an ACI layout by using a PPC module.

FIG. 18 illustrates an example of inferring an ACI layout by using the PPC module 200. Referring to FIGS. 1 and 18, the electronic device 100 may perform at least one of first inference, second inference, third inference, and fourth inference by using the PPC module 200.

As an example of the first inference, the PPC module 200 may infer a first ACI layout bias ACI_BA1 and a second ACI layout bias ACI_BA2 of each segment of an ACI layout based on a first bias BA1 and a second bias BA2 of each segment of an input layout, and features tagged on each segment.

As an example of the second inference, the PPC module 200 may infer a mis-align MA of each segment of the ACI layout based on the first bias BA1 and the second bias BA2 of each segment of the input layout, and the features tagged on each segment.

As an example of the third inference, the PPC module 200 may infer an ACI layout mis-align ACI_MA of each segment of the ACI layout based on the mis-align MA of each segment of the input layout, and the features tagged on each segment.

As an example of the fourth inference, the PPC module 200 may infer an ACI layout critical dimension ACI_CD of each segment of the ACI layout based on a critical dimension CD of each segment of the input layout, and the features tagged on each segment.

An example in which the PPC module 200 performs inference by using one of the bias(s) BA, the mis-align MA, and the critical dimension CD as an input is described, but the PPC module 200 may perform inference using more or fewer inputs. For example, the inference may be formed using combinations of two or more of the bias(s) BA, the mis-align MA, and the critical dimension CD as an input. Also, an example in which the PPC module 200 performs inference by using one of the ACI layout bias(s) ACI_BA, the ACI layout mis-align ACI_MA, and the ACI layout critical dimension ACI_CD as an output, but the PPC module 200 may perform inference by using combinations of two or more of the ACI layout bias(s) ACI_BA, the ACI layout mis-align ACI_MA, and the ACI layout critical dimension ACI_CD as an output.

Figure 19:
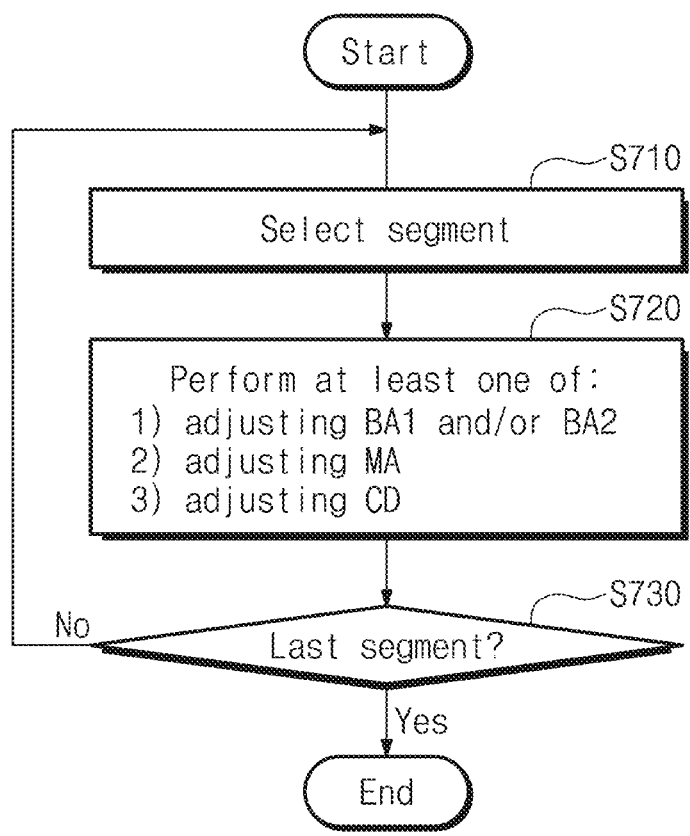
FIG. 19 is a flowchart illustrating an example of a process in which an electronic device adjusts an input layout of a PPC module.

FIG. 19 illustrates an example of a process in which the electronic device 100 adjusts an input layout of the PPC module 200. Referring to FIGS. 1 and 19, in operation S710, the electronic device 100 may select a segment of an input layout. In operation S720, the electronic device 100 may adjust at least one of a bias(s) BA, a mis-align MA, and a critical dimension CD in the selected segment.

In operation S730, the electronic device 100 may determine whether the selected segment is the last segment. For example, the electronic device 100 may determine whether adjustment is performed on all the segments. For example, the electronic device 100 may determine whether adjustment is performed on all segments contacting a space or on all segments regardless of whether to contact a space.

When the selected segment is not the last segment, the electronic device 100 may select a next segment in operation S710 and may adjust the newly selected segment in operation S720. When the selected segment is the last segment, the electronic device 100 may terminate the adjustment of the input layout.

As described above, the electronic device 100 according to some example embodiments of the present disclosure may train the PPC module 200 so as to infer an ACI layout from an input layout and features. Also, the electronic device 100 may infer the ACI layout from the input layout and the features by using the PPC module 200 and may adjust the input layout such that the ACI layout converges into the design layout. Accordingly, the amount of computation for performing PPC may be reduced, a time taken to perform PPC may decrease, and the reliability of PPC may be improved.

In the above embodiments, components according to the present disclosure are described by using the terms "first", "second", "third", etc. However, the terms "first", "second", "third", etc. may be used to distinguish components from each other and do not otherwise limit the present disclosure. For example, the terms "first", "second", "third", etc. do not involve an order or a numerical meaning of any form.

In the above embodiments, some of the components according to the embodiments of the present disclosure are referenced by using blocks. The blocks may be implemented with various hardware devices, such as an integrated circuit, an application specific IC (ASIC), a field programmable gate array (FPGA), memory, and a complex programmable logic device (CPLD); firmware driven in hardware devices; software such as an application; and/or a combination of a hardware device and software. Also, the blocks may include circuits implemented with semiconductor elements in an integrated circuit, or circuits enrolled as an intellectual property (IP). Furthermore, the term "processor," 'driver," "unit" and/or "module" denote elements that process at least one function or operation and may be included in and/or implemented as processing circuitry such hardware, software, or the combination of hardware and software. For example, the processing circuitry more specifically may include (and/or be included in), but is not limited to, a digital signal processor, a microcomputer, a field programmable gate array (FPGA), a System-on-Chip (SoC), a programmable logic unit, a microprocessor, application-specific integrated circuit (ASIC), etc.

According to the present disclosure, machine learning-based inference is performed based on features of patterns and features of an environment associated with the patterns, and a layout is generated as a result of the inference. Accordingly, an electronic device capable of generating a layout for manufacturing a semiconductor device with improved reliability and the amount of computation reduced, and an operating method of the electronic device are provided.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An operating method of an electronic device for manufacturing a semiconductor device, the method comprising:
receiving a design layout for manufacturing the semiconductor device;
generating a first after cleaning inspection (ACI) layout by performing a machine learning-based process proximity correction on the design layout;
generating a second after cleaning inspection layout by adjusting the design layout based on a difference of the first after cleaning inspection layout and the design layout;
performing the machine learning-based process proximity correction on the adjusted layout;
outputting the adjusted layout as a first layout when a difference between the second after cleaning inspection layout and the design layout is smaller than or equal to a threshold value;
generating a second layout by performing optical proximity correction (OPC) on the first layout; and
outputting the second layout for a semiconductor process.

2. The method of claim 1, further comprising:
performing segmentation on the design layout to a plurality of segments,
wherein the generating the second after cleaning inspection layout is based on the plurality of segments.

3. The method of claim 2, wherein the generating the second after cleaning inspection layout is based on at least one of a bias(s), a critical dimension (CD), and a mis-align of the plurality of segments.

4. The method of claim 3, wherein the design layout is adjusted by adjusting at least one of the bias(s), the critical dimension, and the mis-align of the plurality of segments.

5. The method of claim 2, wherein the performing the segmentation on the design layout includes:
selecting ones of polygons and spaces of the design layout; and
dividing the selected ones into the plurality of segments.

6. The method of claim 5, wherein the dividing of the selected ones into the plurality of segments includes:
dividing the selected ones at intersection of different edges of the selected ones.

7. The method of claim 5, wherein the dividing of the selected ones into the plurality of segments includes:
dividing the selected ones at a point at which a distance between adjacent ones of the selected ones changes.

8. The method of claim 5, wherein the dividing of the selected ones into the plurality of segments includes:
dividing the selected ones at a boundary of sublayers of the selected ones.

9. The method of claim 1, further comprising:
when the difference between the second after cleaning inspection layout and the design layout is greater than the threshold value, generating a subsequent after cleaning inspection layout by again adjusting the adjusted design layout based on a difference of the second after cleaning inspection layout and the design layout and executing the machine learning-based process proximity correction on the again adjusted layout; and
repeating the generating the subsequent after cleaning inspection layout until a difference between the subsequent after cleaning inspection layout and the design layout is smaller than or equal to the threshold value; and
outputting the again adjusted layout as the first layout when the difference between the subsequent after cleaning inspection layout and the design layout is smaller than or equal to the threshold value.

10. An operating method of an electronic device for manufacturing a semiconductor device, the method comprising:
receiving a design layout and an after cleaning inspection (ACI) layout corresponding to the design layout;
measuring at least one of a bias(s), a critical dimension (CD), or a mis-align between the design layout and the after cleaning inspection layout;
tagging features on the after cleaning inspection layout; and
performing learning on a process proximity correction module based on the tagged features and at least one of the bias(s), the critical dimension, or the mis-align.

11. The method of claim 10, further comprising:
selecting ones of polygons and spaces of the design layout; and
dividing the selected ones into a plurality of segments.

12. The method of claim 11, wherein the measuring of the at least one of the bias(s), the critical dimension (CD), or the mis-align is performed on each of the plurality of segments.

13. The method of claim 12, wherein the tagging of the features on the after cleaning inspection layout is performed on each of the plurality of segments.

14. The method of claim 13, wherein the tagging of the features on the after cleaning inspection layout is performed on at least one edge of each of the plurality of segments.

15. The method of claim 14, wherein the features include:
a direction of a first edge of a first segment; and
a length of the first edge.

16. The method of claim 15, wherein the features include:
a first width of the first segment in the first edge direction; and
a second width of at least one neighbor segment adjacent to the first segment in the first edge direction, the second width being a width in the first edge direction.

17. The method of claim 15, wherein the features include:
a first width of a space contacting the first segment in the first edge direction, the first width being a width in the first edge direction; and
a second width of at least one neighbor space adjacent to the first segment in the first edge direction, the second width being a width in the first edge direction.

18. The method of claim 15, wherein the features include at least one of a density of the selected ones in a first range of the first segment in the first edge direction, information of sublayers in a second range of the first segment in the first edge direction, features of a segment located next to the first segment in a counterclockwise from the first edge, or features of a segment located before the first segment in a counterclockwise from the first edge.

19. The method of claim 10, wherein the performing of the learning on the process proximity correction module features include:
performing learning on the process proximity correction module so as to output a second after cleaning inspection layout corresponding to an input layout, when at least one of a bias(s), a critical dimension, and/or a mis-align of the input layout are input to the process proximity correction module.

20. An electronic device comprising:
a memory; and
at least one processor configured to execute a machine learning-based process proximity correction module for manufacturing a semiconductor device, by using the memory,
wherein the at least one processor is configured to
generate a first after cleaning inspection (ACI) layout by executing the machine learning-based process proximity correction on a design layout stored in the memory;
adjusting the design layout based on a difference of the design layout and the first after cleaning inspection layout;
executing the machine learning-based process proximity correction on the adjusted layout to generate a second after cleaning inspection (ACI) layout; and
storing, in the memory, the adjusted layout as a layout in which process proximity correction is completed when a difference of the design layout and the second after cleaning inspection layout is smaller than or equal to a threshold value.

* * * * *